(12) United States Patent
Mehrotra

(10) Patent No.: US 7,224,731 B2
(45) Date of Patent: May 29, 2007

(54) MOTION ESTIMATION/COMPENSATION FOR SCREEN CAPTURE VIDEO

(75) Inventor: Sanjeev Mehrotra, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 491 days.

(21) Appl. No.: 10/186,473

(22) Filed: Jun. 28, 2002

(65) Prior Publication Data

US 2004/0001544 A1    Jan. 1, 2004

(51) Int. Cl.
*H04N 7/12* (2006.01)
*G06K 9/36* (2006.01)

(52) U.S. Cl. .................. 375/240.16; 382/236

(58) Field of Classification Search ........... 375/240.16, 375/240.24, 240.15, 240.08; 382/242, 103, 382/236, 284; 715/781
See application file for complete search history.

(56) References Cited

U.S. PATENT DOCUMENTS

| | | | |
|---|---|---|---|
| 4,661,849 A | | 4/1987 | Hinman |
| 4,661,853 A | | 4/1987 | Roeder et al. |
| 4,695,882 A | | 9/1987 | Wada et al. |
| 4,800,432 A | | 1/1989 | Barnett |
| 4,937,036 A | | 6/1990 | Beard et al. |
| 5,043,919 A | | 8/1991 | Callaway et al. |
| 5,168,356 A | * | 12/1992 | Acampora et al. ..... 375/240.15 |
| 5,243,420 A | | 9/1993 | Hibi |
| 5,266,941 A | | 11/1993 | Akeley et al. |
| 5,295,201 A | | 3/1994 | Yokohama |
| 5,317,397 A | | 5/1994 | Akeley |
| 5,394,170 A | | 2/1995 | Akeley et al. |
| 5,412,430 A | | 5/1995 | Nagata et al. |
| RE34,965 E | | 6/1995 | Sugiyama et al. |
| 5,424,779 A | | 6/1995 | Odaka et al. |
| 5,467,136 A | | 11/1995 | Odaka et al. |
| 5,477,272 A | | 12/1995 | Zhana et al. |

(Continued)

FOREIGN PATENT DOCUMENTS

EP    0279053    8/1988

(Continued)

OTHER PUBLICATIONS

Hsieh et al., "A Novel Fast Estimation Algorithm Using Fixed Subsampling Pattern and Multiple Local Winners Search", *Proc. 2001 IEEE Int'l Symposium on Circuits and Systems (ISCAS 2001)*, vol. 2, pp. 241-244 (2001).

(Continued)

*Primary Examiner*—Gims Philippe
(74) *Attorney, Agent, or Firm*—Klarquist Sparkman, LLP

(57) ABSTRACT

The present invention relates to motion estimation and compensation. For example, a screen capture encoder performs motion estimation that is adapted to screen capture video in various respects. For example, the motion estimation uses a distortion measure based upon the count of equal/unequal pixels in two regions, sub-samples the distortion measure to speed up motion estimation, and/or uses a search pattern that prioritizes types of motion common in screen capture video. Or, a screen capture decoder performs motion compensation that is adapted to screen capture video in various respects. For example, the decoder performs the motion compensation for pixels with different values at corresponding locations in a current frame and a reference frame, but not for all pixels of the current frame. Alternatively, an encoder/decoder performs the motion estimation/compensation to compress/decompress other kinds of content.

34 Claims, 13 Drawing Sheets

U.S. PATENT DOCUMENTS

| | | | |
|---|---|---|---|
| RE35,158 E | 2/1996 | Sugiyama et al. | |
| 5,533,140 A | 7/1996 | Sirat et al. | |
| 5,565,922 A | 10/1996 | Krause | |
| 5,594,504 A * | 1/1997 | Ebrahimi | 375/240.16 |
| 5,619,281 A | 4/1997 | Jung | |
| 5,668,608 A | 9/1997 | Lee | |
| 5,673,339 A | 9/1997 | Lee | |
| 5,678,002 A | 10/1997 | Fawcett et al. | |
| 5,689,306 A | 11/1997 | Jung | |
| 5,692,063 A | 11/1997 | Lee et al. | |
| 5,742,344 A | 4/1998 | Odaka | |
| 5,745,738 A | 4/1998 | Ricard | |
| 5,784,175 A | 7/1998 | Lee | |
| 5,796,855 A | 8/1998 | Lee | |
| 5,825,929 A | 10/1998 | Chen et al. | |
| 5,844,613 A | 12/1998 | Chaddha | |
| 5,847,776 A | 12/1998 | Khmelnitsky et al. | |
| 5,912,991 A * | 6/1999 | Jeon et al. | 382/242 |
| 5,929,940 A | 7/1999 | Jeannin | |
| 5,949,489 A | 9/1999 | Nishikawa et al. | |
| 5,963,258 A | 10/1999 | Nishikawa et al. | |
| 5,963,259 A | 10/1999 | Nakaya et al. | |
| 5,970,173 A | 10/1999 | Lee et al. | |
| 5,970,175 A | 10/1999 | Nishikawa et al. | |
| 5,973,755 A | 10/1999 | Gabriel | |
| 5,982,438 A | 11/1999 | Lin et al. | |
| 5,986,713 A | 11/1999 | Odaka et al. | |
| 5,990,960 A | 11/1999 | Murakami et al. | |
| 6,002,439 A | 12/1999 | Murakami et al. | |
| 6,005,980 A | 12/1999 | Eifring et al. | |
| 6,058,212 A | 5/2000 | Yokoyama | |
| 6,067,322 A | 5/2000 | Wang | |
| RE36,822 E | 8/2000 | Sugiyama | |
| 6,097,759 A | 8/2000 | Murakami et al. | |
| 6,188,777 B1 * | 2/2001 | Darrell et al. | 382/103 |
| 6,188,794 B1 | 2/2001 | Nishikawa et al. | |
| 6,195,389 B1 | 2/2001 | Rodriguez et al. | |
| 6,219,464 B1 | 4/2001 | Greggain et al. | |
| 6,226,407 B1 | 5/2001 | Zabih et al. | |
| 6,233,017 B1 | 5/2001 | Chaddha | |
| 6,249,318 B1 | 6/2001 | Girod et al. | |
| 6,281,942 B1 | 8/2001 | Wang | |
| 6,295,376 B1 | 9/2001 | Nakaya | |
| 6,307,973 B2 | 10/2001 | Nishikawa et al. | |
| 6,337,881 B1 | 1/2002 | Chaddha | |
| 6,339,656 B1 | 1/2002 | Marui | |
| 6,404,813 B1 | 6/2002 | Haskell | |
| 6,418,166 B1 | 7/2002 | Wu et al. | |
| 6,421,738 B1 | 7/2002 | Ratan et al. | |
| 6,430,316 B1 | 8/2002 | Wilkinson | |
| 6,483,874 B1 * | 11/2002 | Panusopone et al. | 375/240.08 |
| 6,501,798 B1 | 12/2002 | Sivan | |
| 6,573,915 B1 * | 6/2003 | Sivan et al. | 715/781 |
| 6,594,313 B1 | 7/2003 | Hazra et al. | |
| 6,650,705 B1 * | 11/2003 | Vetro et al. | 375/240.08 |
| 6,654,419 B1 | 11/2003 | Sriram et al. | |
| 6,697,427 B1 | 2/2004 | Kurak, Jr. et al. | |
| 6,728,317 B1 | 4/2004 | Demos | |
| 6,748,391 B1 | 6/2004 | Schwerdtfeger et al. | |
| 6,834,128 B1 * | 12/2004 | Altunbasak et al. | 382/284 |
| 6,876,703 B2 | 4/2005 | Ismaeil et al. | |
| 6,968,008 B1 | 11/2005 | Ribas-Corbera et al. | |
| 2002/0154693 A1 | 10/2002 | Demos et al. | |
| 2003/0128754 A1 | 7/2003 | Akimoto et al. | |
| 2003/0156643 A1 | 8/2003 | Song | |
| 2003/0156646 A1 | 8/2003 | Hsu et al. | |
| 2004/0081361 A1 | 4/2004 | Chen et al. | |
| 2004/0114688 A1 | 6/2004 | Kang | |
| 2005/0013500 A1 | 1/2005 | Lee et al. | |
| 2005/0094731 A1 | 5/2005 | Xu et al. | |
| 2005/0135484 A1 | 6/2005 | Lee et al. | |
| 2005/0147167 A1 | 7/2005 | Dumitras et al. | |
| 2005/0169546 A1 | 8/2005 | Shin et al. | |
| 2005/0226335 A1 | 10/2005 | Lee et al. | |
| 2006/0002471 A1 | 1/2006 | Lippincott et al. | |
| 2006/0013309 A1 | 1/2006 | Ha et al. | |

FOREIGN PATENT DOCUMENTS

| | | |
|---|---|---|
| EP | 0526163 | 2/1993 |
| EP | 0535746 | 4/1993 |
| EP | 0614318 | 9/1994 |
| EP | 0825778 | 2/1998 |
| JP | 2924430 B2 | 5/1993 |
| JP | 3085289 B2 | 6/1999 |
| JP | 3173508 B2 | 5/2000 |
| WO | WO 00/33581 | 6/2000 |

OTHER PUBLICATIONS

Matthias, "An Overview of Microsoft Windows Media Screening Technology," 3 pp. (2000) [Downloaded from the World Wide Web on May 1, 2002.]

Gill et al., "Creating High-Quality Content with Microsoft Windows Media Encoder 7," 4 pp. (2000) [Downloaded from the World Wide Web on May 1, 2002.]

Chen et al., "A Fast Block Matching Algorithm Based on the Winner-Update Strategy," *Proc. Fourth Asian Conference on Computer Vision*, vol. 2, pp. 977-982, Taipei, Taiwan (2000).

Tourapis et al., "Fast Motion Estimation Using Modified Circular Zonal Search," *Proc. SPIE, VCIP'99*, San Jose, CA, 4 pp. (1999).

Yue et al., "A Fast Effective Block Motion Estimation Algorithm," *Proc. 4th Int'l Conf. on Signal Processing (ICSP '98)*, Beijing, pp. 827-830 (1998).

Tzanetakis et al., "Motion Estimation Based in Affine Moment Invariants," *Proc. European Signal Processing Conference 1998 (EUSIPCO '98)*, Rhodes, Greece, 4 pp. (1998).

Kim et al., "A Fast Three-Step Search Algorithm With Minimum Checking Points Using Unimodal Error Surface Assumption," *IEEE Transactions on Consumer Electronics*, vol. 44, No. 3, pp. 638-648 (1998).

Palmer et al., "Shared Desktop: A Collaborative Tool for Sharing 3-D Applications Among Different Window Systems," *Digital Technical Journal*, vol. 9, No. 3, pp. 42-49 (1997).

U.S. Appl. No. 60/341,674, filed Dec. 17, 2001, Lee et al.

U.S. Appl. No. 60/201,278, filed Nov. 30, 1998, Lin et al.

Cumhur Aksoy, "Wireless Thin Client Optimization for Multimedia Applications," M.S. Thesis, 166 pp. (2000).

Benzler et al., "Improving multiresolution motion compensating hybrid coding by drift reduction," *Picture Coding Symposium*, 4 pp. (1996).

Conklin et al., "Multi-resolution Motion Estimation," *Proc. ICASSP '97*, Munich, Germany, 4 pp. (1997).

Doering, "Low-Cost, High-Impact Video Production Techniques for Laboratory Instructional Materials," *ASEE/IEEE Frontiers in Education Conference*, Session F1C, pp. 14-18 (Oct. 2001).

Ericsson, "Fixed and Adaptive Predictors for Hybrid Predictive/Transform Coding," *IEEE Transactions on Communications*, vol. COM-33, No. 12, pp. 1291-1302 (1985).

Gibson et al., *Digital Compression for Multimedia: Principles and Standards*, Chapter 11, pp. 363-417, Morgan Kaufmann Publishers (1998).

Girod, "Motion Compensation: Visual Aspects, Accuracy, and Fundamental Limits," *Motion Analysis and Image Sequencing Processing*, Kluwer Academic Publishers, pp. 125-152 (1993).

Horn et al., "Estimation of motion vector fields for multiscale motion compensation," *Proceedings Picture Coding Symposium (PCS 97)*, pp. 141-144 (Sep. 1997).

ISO/IEC, "Coding of Moving Pictures and Associated Audio for Digital Storage Media at Up to About 1.5 Mbit/s, Part 2: Video," 11172-2, 112 pp. (1993).

ISO/IEC, "Coding of Audio-Visual Objects: Visual, ISO/IEC 14496-2," 14496-2, 330 pp. (1998).

ISO/IEC, "MPEG-4 Video Verification Model Version 10.0," JTC1/SC29/WG11, MPEG98/N1992, 305 pp. (1998).

ITU-T Recommendation H.261, "Line of Transmission of Non-Telephone Signals," International Telecommunication Union, pp. i, 1-25 (Mar. 1993).

ITU-T Recommendation H.262, "Transmission of Non-Telephone Signals," International Telecommunication Union, 204 pp. (Jul. 1995).

ITU-T Recommendation H.263, "Series H: Audiovisual and Multimedia Systems, Infrastructure of Audiovisual Services—Coding of Moving Video," International Telecommunication Union, 155 pp. (Feb. 1998).

Iwahashi et al., "A Motion Compensation Technique for Downscaled Pictures in Layered Coding," *IEICE Transactions on Comm.*, vol. E77-B, No. 8, pp. 1007-1012 (Aug. 1994).

"MPEG Video Compression Technique," 9 pp. [Downloaded from the World Wide Web on Mar. 14, 2005].

Microsoft Corporation, "BitBlt" 8 pp. [Downloaded from the World Wide Web on Apr. 25, 2002].

Morimoto et al., "Fast Electronic Digital Image Stabilization," *Proc. ICPR*, Vienna, Austria, 5 pp. (1996).

Nieh et al., "Measuring the Multimedia Performance of Server-Based Computing," *Proc. 10th Intl. Workshop on Network and Operating System Supporting for Digital Audio and Video*, 10 pp. (2000).

Pike, "Graphics in Overlapping Bitmap Layers," *Computing Science Technical Report No. 999*, AT&T Bell Labs., 25 pp. (1983).

Reader, "History of MPEG Video Compression—Ver. 4.0," 99 pp., document marked Dec. 16, 2003.

Schulzrinne, "Operating System Issues for Continuous Media," *ACM Multimedia Systems*, vol. 4, No. 5, 13 pp. (1996).

Solari, *Digital Video and Audio Compression*, Chapter 4, pp. 77-108 The McGraw-Hill Companies (1997).

Techsmith Corporation, "Techsmith Camtasia Screen Recorder SDK," 2 pp. (2001).

Techsmith Corporation, "Camtasia Feature of the Week: Quick Capture," 2 pp. (Downloaded from the World Wide Web on May 9, 2002; document dated Jan. 4, 2001).

Techsmith Corporation, "Camtasia Screen Recorder SDK DLL API User Guide," version 1.0, 66 pp. (2001).

Techsmith Corporation, "Camtasia v3.0.1—README.TXT," 19 pp. (Jan. 2002).

"Video Coding Using Wavelet Decomposition for Very Low Bit-rate Networks," 16 pp. (1997).

IBM, Technical Disclosure Bulletin, "Advanced Motion Estimation for Moving Picture Expert Group Encodes," vol. 39, No. 4, pp. 323-324 (1996).

Li et al., "Optimal Linear Interpolation Coding for Server-Based Computing," *Proc. IEEE Int'l Conf. on Communications*, 5 pp. (Apr.-May 2002).

OPTX International, "OPTX Improves Technology-Based Training with ScreenWatch™ 3.0. Versatile Screen Capture Software Adds High Color and Live Webcast Support," 1 p., document marked Feb. 15, 2001 [downloaded from the World Wide Web on Sep. 22, 2005].

OPTX International, "OPTX International Marks One Year Anniversary of ScreenWatch With Release of New 2.0 Version," 1 p., document marked May 16, 2000 [downloaded from the World Wide Web on Sep. 22, 2005].

OPTX International, "New Screen Watch™ 4.0 Click and Stream™ Wizard From OPTX International Makes Workplace Communication Effortless," 1 p., document marked Sep. 24, 2001 [downloaded from the World Wide Web on Sep. 22, 2005].

Schaar-Mitrea et al., "Hybrid Compression of Video with Graphics in DTV Communication Systems," *IEEE Trans. on Computer Electronics*, pp. 1007-1017 (2000).

Seferidis, "General Approach to Block-matching Motion Estimation," *Optical Engineering*, vol. 32, No. 7, pp. 1464-1474 (1993).

Borman et al., "Block-Matching Sub-Pixel Motion Estimation from Noisy, Under-Sampled Frames—an Empirical Performance Evaluation," SPIE Visual Communications and Image Processing, 10 pp. (1999).

Chen et al., "Fast Motion Estimation for JVT," JVT-G016, 12 pp. (Downloaded from the World Wide Web on Mar. 18, 2006).

Choi et al., "The Fast Mode Decision with Fast Motion Estimation," JVT-N013, 8 pp. (Downloaded from the World Wide Web on Jan. 27, 2006).

Diehl, "Object-Oriented Motion Estimation and Segmentation in Image Sequences," *Signal Processing: Image Communication*, pp. 23-56 (1991).

"Digital Video Processing (EE392J)," Department of Electrical Engineering, Stanford University, Problem Set No. 2, 4 pp. (Document marked Jan. 21, 2004).

"DivX Multi Standard Video Encoder," 2 pp. (Downloaded from the World Wide Web on Jan. 24, 2006).

Fang et al., Block Matching Video Chip, *in MIT MTL Annual Report*, 1998, pp. 7-8 (1998).

Goh et al., "Model-Based Multiresolution Motion Estimation from Noisy Images," *CVGIP: Image Understanding*, vol. 59, No. 3, pp. 307-319 (1994).

Hallapuro et al., "Performance Analysis of Low Bit Rate H.26L Video Encoder," *Proc. IEEE International Conference on Acoustics, Speech and Signal Processing*, vol. 2, pp. 1129-1132 (May 2001).

Hong et al., "Further Improvement of Motion Search Range," JVT-C065, 5 pp. (Downloaded from the World Wide Web on Mar. 18, 2006.).

Hong et al., "Further Improvement of Motion Search Range," JVT-D117, 5 pp. (Downloaded from the World Wide Web on Mar. 18, 2006).

Hong et al., "Range Decision for Motion Estimation of VCEG-N33," JVT-B022, 4 pp. (Downloaded from the World Wide Web on Mar. 18, 2006).

Kim et al., "Low-Complexity Macroblock Mode-Selection for H.264/AVC Encoders," *Image Processing*, vol. 2, pp. 765-768 (Oct. 2004).

Sullivan et al., "The H.264/AVC Advanced Video Coding Standard: Overview and Introduction to the Fidelity Range Extensions," 21 pp. (Aug. 2004).

Tourapis et al., "Fast ME in the JM Reference Software," JVT-P026, 26 pp. (Downloaded from the World Wide Web on Mar. 18, 2006).

Wiegand, "Joint Model No. 1, Revision 1 (JM1-r1)," JVT-A003r1, 80 pp. (Document marked "Generated: Jan. 18, 2002").

Wu et al., "A gradient-based method for general motion estimation and segmentation," *J. Visual Communication and Image Representation*, vol. 4, No. 1, pp. 25-38 (1993).

Xu et al., "Comments on Motion Estimation Algorithms in Current JM Software," JVT-Q089, 12 pp. (Downloaded from the World Wide Web on Mar. 18, 2006).

Xu et al., "Modification of Dynamic Search Range for JVT," JVT-Q088, 7 pp. (Downloaded from the World Wide Web on Mar. 18, 2006).

Yi et al., "Improved and Simplified Fast Motion Estimation for JM," JVT-P021, 23 pp. (Downloaded from the World Wide Web on Mar. 18, 2006).

\* cited by examiner

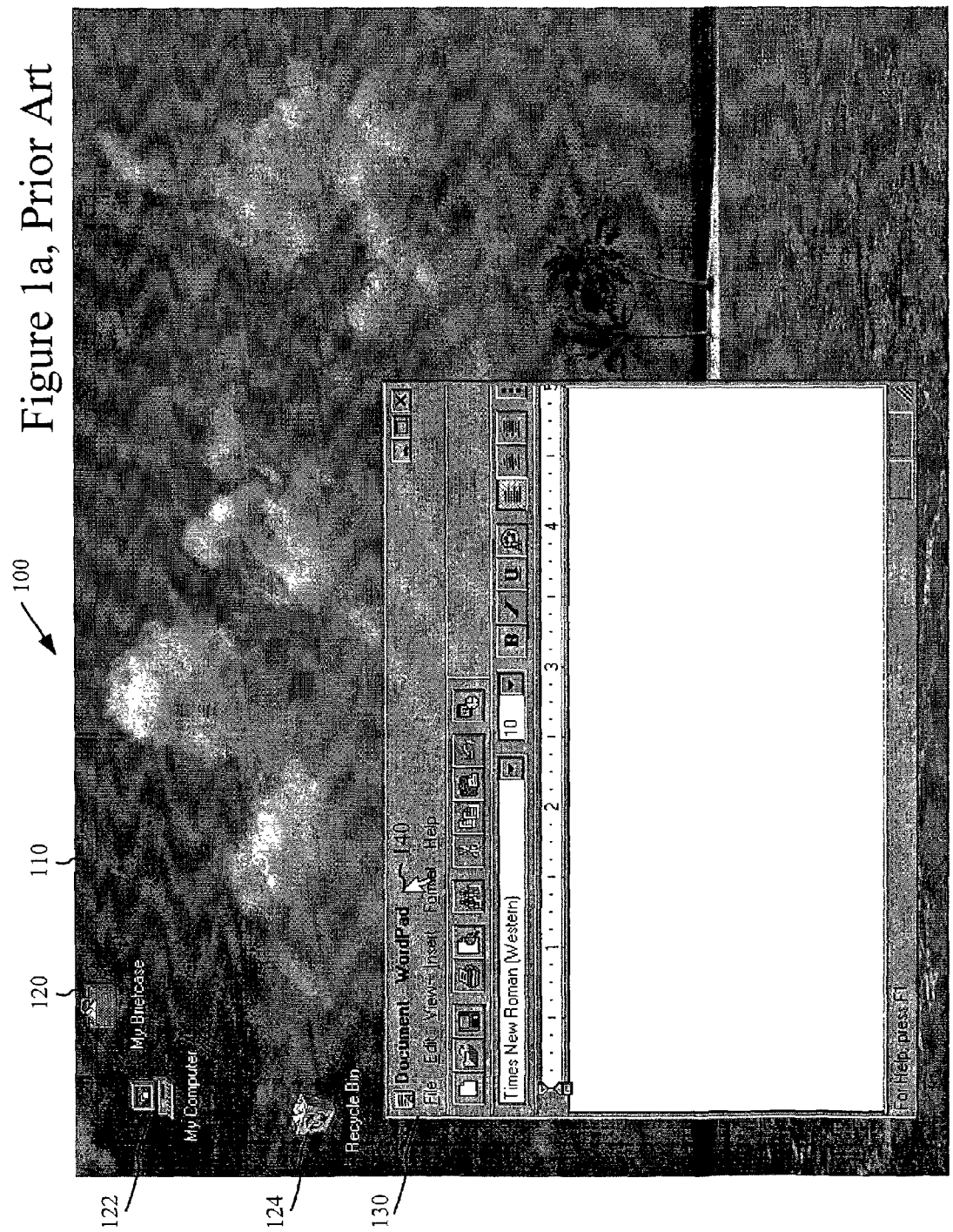
Figure 1a, Prior Art

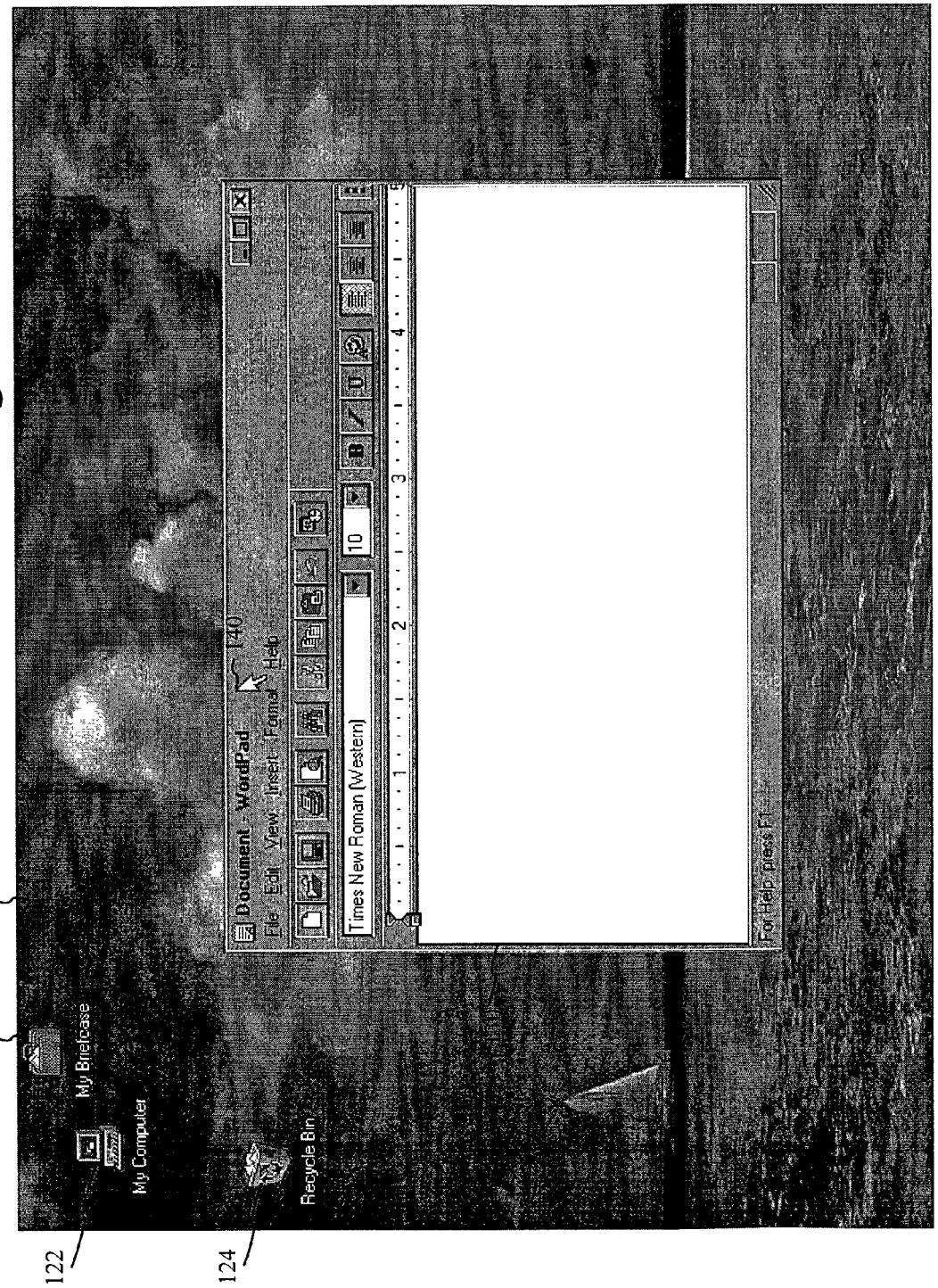
Figure 1b, Prior Art

Software 280 Implementing a Screen Capture
Encoder/Decoder with Motion Estimation/
Compensation for Screen Capture Video

```
5 5 4 4 2 4 4 5 5
5 5 4 4 2 4 4 5 5
3 3 3 3 2 3 3 3 3
3 3 3 3 2 3 3 3 3
1 1 1 1 X 1 1 1 1
3 3 3 3 2 3 3 3 3
3 3 3 3 2 3 3 3 3
5 5 4 4 2 4 4 5 5
5 5 4 4 2 4 4 5 5
```

```
X 0 0 0 0 X 0 0 0 0 X 0 0 0 0
0 0 0 0 0 0 0 0 0 0 0 0 0 0 0
0 0 0 0 0 0 0 0 0 0 0 0 0 0 0
X 0 0 0 0 X 0 0 0 0 X 0 0 0 0
0 0 0 0 0 0 0 0 0 0 0 0 0 0 0
0 0 0 0 0 0 0 0 0 0 0 0 0 0 0
X 0 0 0 0 X 0 0 0 0 X 0 0 0 0
0 0 0 0 0 0 0 0 0 0 0 0 0 0 0
```

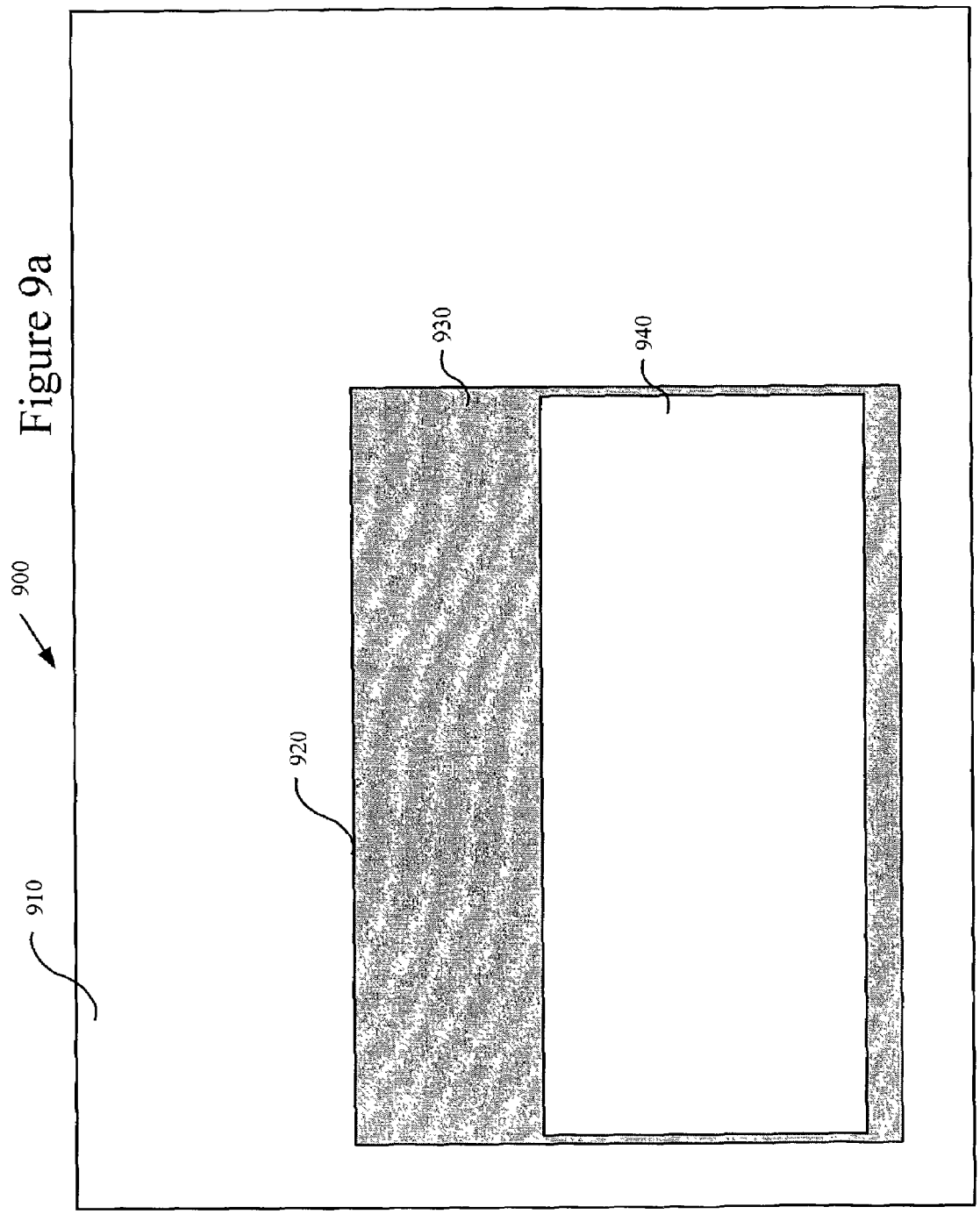

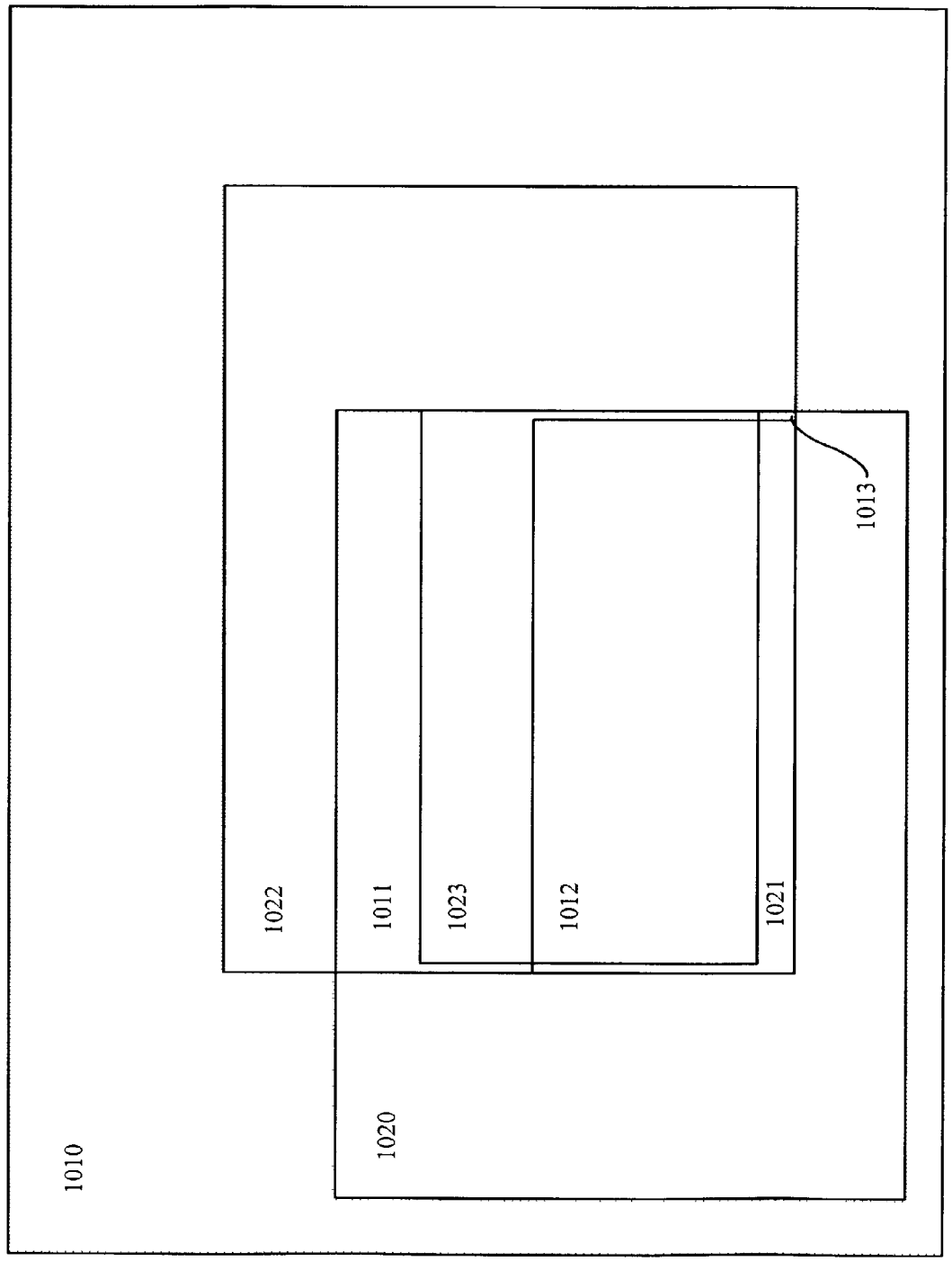

MOTION ESTIMATION/COMPENSATION FOR SCREEN CAPTURE VIDEO

FIELD

The present invention relates to motion estimation and motion compensation in frame sequences. For example, a screen capture encoder performs motion estimation on screen capture video to facilitate compression of the video.

RELATED APPLICATION DATA

The following concurrently filed U.S. patent applications relate to the present application: 1) U.S. patent application Ser. No. 10/186,481, entitled, "Rate Allocation for Mixed Content Video," filed Jun. 28, 2002, the disclosure of which is hereby incorporated by reference; 2) U.S. patent application Ser. No. 10/186,639, entitled, "Adaptive Entropy Encoding/Decoding for Screen Capture Content," filed Jun. 28, 2002, the disclosure of which is hereby incorporated by reference; and 3) U.S. patent application Ser. No. 10/186,887, entitled, "Text Detection in Continuous Tone Image Segments," filed Jun. 28, 2002, the disclosure of which is hereby incorporated by reference.

BACKGROUND

Screen capture tools let a computer user record an image displayed on a visual display unit such as a computer monitor. The user might use the captured screen area (alternatively called a screen area, screen image, screen shot, screen frame, screen region, capture area, capture image, capture shot, etc.) in a help manual or report to show the results displayed on the display unit at a particular time.

For some applications, a user captures a series of screen areas to show how screen content changes. The user might use the series of captured screen areas within an instructional video for job training or remote instruction. Changes in screen content can occur, for example, when windows or menus are opened, closed, moved, resized, or scrolled.

FIG. 1a is a captured screen area (100) of a computer desktop environment according to the prior art. The captured screen area (100) shows the entire desktop, but could instead show only the window (130) or some other portion of the desktop. A cursor graphic (140) overlays the window (130), and several icon graphics (120, 122, 124) overlay the background (110). FIG. 1b shows a captured screen area (101) following the captured screen area (100) of FIG. 1a in a series according to the prior art. Much of the screen content shown in FIGS. 1a and 1b is identical. Screen content such as the background (110) and icon graphics (120, 122, 124) usually does not change from frame to frame. On the other hand, the cursor graphic (140) often changes position and shape as the user manipulates a mouse or other input device, and the position and contents of the window (130) often change as a user moves or resizes the window, types, adds graphics, etc. FIG. 1b shows the cursor graphic (140) and the window (130) changing locations as the user drags the window (130) across the desktop, which in turn changes which portions of the background (110) are exposed.

Screen capture video and other forms of digital video consume large amounts of storage and transmission capacity. A typical screen capture video sequence may include 10 or more frames per second. Each frame can include tens or hundreds of thousands of pixels (also called pels). Each pixel is a tiny element of the picture. In raw form, a computer commonly represents a pixel with 24 bits. Thus, the number of bits per second, or bitrate, of a raw digital video sequence can be 5 million bits/second or more.

Many computers and computer networks lack the resources to process raw digital video. For this reason, engineers often use compression (also called coding or encoding) to reduce the bitrate of digital video. Compression can be lossless, in which quality of the video does not suffer but decreases in bitrate are limited by the complexity of the video. Or, compression can be lossy, in which quality of the video suffers but decreases in bitrate are more dramatic. Decompression reverses compression.

I. Compression Techniques for Camera Video

Numerous techniques have been developed for compressing conventional camera video. Such techniques include intraframe compression techniques (in which a frame is compressed as a still image) and interframe compression techniques (in which a frame is predicted or estimated from one or more other frames). Intraframe compression often involves frequency transformations on data followed by lossy and lossless compression. Interframe compression can include motion estimation.

Motion estimation is a process for estimating motion between frames. In one common technique, an encoder using motion estimation attempts to match a block of pixels in a current frame with a similar block of pixels in a search area in another frame (called the reference frame). When the encoder finds an exact or "close enough" match in the search area in the reference frame, the encoder parameterizes the change in position of the blocks as motion data (such as a motion vector).

Conversely, motion compensation is a process of reconstructing frames from reference frames using motion data. In one common technique, an encoder or decoder reconstructs a current frame by applying motion data for the current frame to a reference frame, creating a predicted frame. The encoder can compress the difference (sometimes called the residual) between the predicted frame and the original version of the current frame using the same techniques as used for intraframe compression (e.g., lossy and lossless compression). The overall bitrate of the camera video depends very much on the bitrate of the residuals, which can predominate in the overall bitrate compared to the bitrate for motion data. The bitrate of residuals is low if the residuals are simple (i.e., due to motion estimation that leads to exact or good matches according to some criteria), or if lossy compression drastically reduces the complexity of the residuals. On the other hand, the bitrate of complex residuals (i.e., those for which motion estimation fails to find good matches) can be higher, depending on the degree of lossy compression applied to reduce the complexity of the residuals.

The goal of motion estimation for camera video is usually to minimize the variance of the residual following motion estimation. Variance is an estimate for complexity/compressibility of the residual for camera video, and minimizing the variance tends to find a match for which fewer bits are needed to code the residual at a given distortion level. An exact match rarely occurs for a block of pixels in camera video and is not essential, since the variance of the residual is approximately minimized at an approximate match. (An approximate match may result in a slightly more complex residual for the block than the best match would, but a slight increase in the complexity of the residual usually does not dramatically increase bitrate. Rather, lossy compression of the residual reduces the slightly increased bitrate without introducing an objectionable amount of distortion upon reconstruction of the block.) Accordingly, distortion measures such as mean absolute difference, mean squared error, sum of squared errors, or some other variation of Euclidean $L^2$ norm are conventionally used in motion estimation for camera video.

For camera video, motion estimation may use a hierarchical search to find general motion data then more precise motion data for a block of pixels. The measure being minimized (e.g., mean squared error or sum of absolute differences) to find a suitable match usually decreases monotonically on the approach to the suitable match. For example, a graph of the distortion measure often has a "bowl" shape: the best match has the minimum distortion (i.e., bottom of the bowl); for other matches, the distortions get worse as the matches get farther away from the best match (i.e., climbing the sides of the bowl). The hierarchical search thus improves search speed by finding good low-precision motion data, and then finding better, higher precision motion data around it.

II. Compression Techniques for Screen Capture Video

Some encoding tools allow coding of screen capture video with any of multiple encoders on a system. The multiple encoders can include, for example, a screen capture encoder that uses lossless compression and conventional video encoders that use a combination of lossy and lossless compression.

Screen capture images often contain a mixture of continuous tone content and palettized content. Continuous tone content includes, for example, photographs or other images with gradually varying colors or tones, and typically uses a range of image tones that appears substantially continuous to the human eye. While it is desirable to encode continuous tone content using only lossless compression if sufficient resources are available, lossy compression can be used (i.e., with a conventional video encoder) to effectively compress continuous tone content at a lower bitrate. The lossy compression, however, can introduce unacceptable distortion in palettized content.

Palettized content includes, for example, icons, toolbars, and command or notepad windows consisting of a flat color background and foreground text of a contrasting color. A color palette typically includes a relatively small set of image colors or tones (e.g., 256 different 24-bit colors). Palettized content often includes areas of perceptually important fine detail—spatially localized, high frequency variations depicting text elements or other image discontinuities. Applying lossy compression to palettized content can result in the loss of perceptually important fine detail. For example, text and sharp edges may be blurred or distorted in the decompressed content. As a result, lossless encoding of palettized content is preferred in many circumstances. Because screen content often includes palettized content, most prior art screen capture encoders use lossless compression to compress screen capture video.

One prior art screen capture encoder uses a lossless encoding algorithm with a pixel map when coding a current frame of screen capture content with interframe compression. The encoder compares pixels at locations (e.g., x, y coordinates) in the current frame with corresponding pixels at the same locations in the previous frame. The pixel map indicates locations at which pixels in the current frame have changed in value and locations at which pixels have not changed in value. For the pixels in the current frame that have not changed in value, the values from the previous frame are used. The encoder then codes the changed pixels (called the intra pixels). In such cases, the number of intra pixels in the current frame is often a good indication of the number of bits needed to code the current frame because coding other data for the current frame (e.g., the map) usually consumes relatively few bits.

This interframe compression is efficient when screen content is fairly static since the number of intra pixels is zero or small. On the other hand, this interframe compression can be inefficient when the number of intra pixels is large, and in screen capture video, even small on-screen movements can change the values of large numbers of pixels.

SUMMARY

The present invention relates to motion estimation and motion compensation. For example, a screen capture encoder performs motion estimation that is adapted to screen capture video, which improves the efficiency of compression of the screen capture video in a wide variety of scenarios.

According to one aspect of the present invention, an encoder such as a screen capture encoder performs motion estimation. In various respects, the motion estimation is adapted to screen capture video. For example, the motion estimation uses a distortion measure based upon the count of equal/unequal pixels in two regions, sub-samples the distortion measure to speed up motion estimation, and/or uses a search pattern that prioritizes types of motion common in screen capture video. Alternatively, the encoder performs the motion estimation to compress other kinds of content.

According to another aspect of the present invention, a decoder such as a screen capture decoder performs motion compensation. In various respects, the motion compensation is adapted to screen capture video. For example, the decoder performs the motion compensation for pixels with different values at corresponding locations in a current frame and a reference frame, but not for all pixels of the current frame. Alternatively, the decoder performs the motion compensation to decompress other kinds of content.

Additional features and advantages will be made apparent from the following detailed description of various embodiments that proceeds with reference to the accompanying drawings.

BRIEF DESCRIPTION OF THE DRAWINGS

FIGS. 1a and 1b are captured screen areas of a computer desktop environment according to the prior art.

FIGS. 9a and 9b are diagrams showing simplified versions of captured screen frames of a computer desktop environment.

FIG. 10 is a diagram of a pixel map showing whether pixels have changed or not changed at locations between the captured screen frames of FIGS. 9a and 9b.

DETAILED DESCRIPTION

Figure 2:
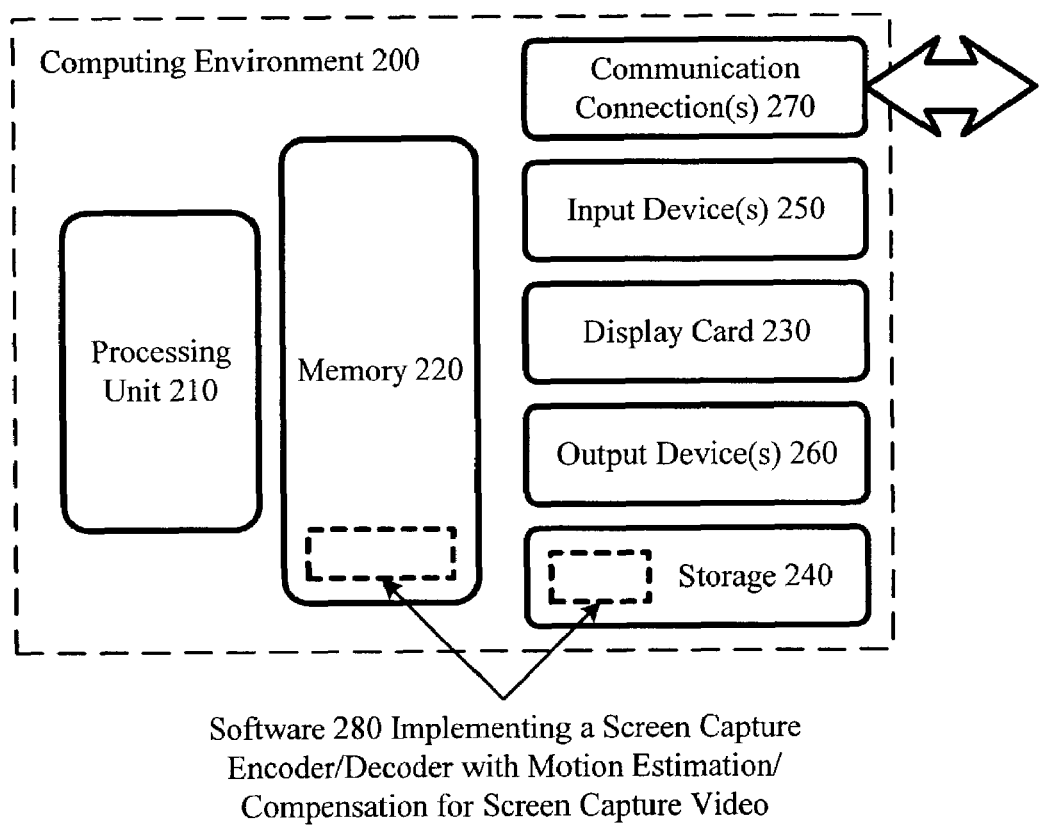
FIG. 2 is a block diagram of a suitable computing environment in which described embodiments may be implemented.

Described embodiments are directed to motion estimation and compensation techniques. In particular, several of the following sections describe a screen capture encoder or decoder performing motion estimation or compensation techniques for screen capture video. In a wide variety of encoding scenarios for screen capture video, these techniques dramatically improve the efficiency of compression.

Screen content often includes windows or other user interface features that are scrolled or dragged, resulting in collective, uniform motion of large groups of pixels. With motion estimation, a screen capture encoder parameterizes changes in screen content, for example, computing one or more motion vectors specifying changes in regions of pixels from frame to frame. Motion estimation and compensation can thus reduce the number of pixels to be encoded by intraframe compression, leading to more efficient overall compression.

For screen capture video, exact matches can often be found for all or part of a region of screen content, and such matches are very important to improving the efficiency of compression. Suppose the best match for a region of screen content with palettized content has low overall distortion (by some variance measure), but few exactly matching pixels. If so, the number of pixels of palettized content in the region that must be encoded losslessly might not be reduced by very much if at all.

Conventional motion estimation algorithms are designed for camera video that is subjected to lossy compression. In addition, while the camera video can have various kinds of motion, displacements from frame to frame are expected to be small. In contrast, screen capture video usually includes palettized content that is losslessly encoded, and motion is frequently due to window dragging and scrolling, which can involve large displacements from frame to frame. Accordingly, several of the following sections describe motion estimation algorithms that are adapted to 1) common patterns of motion in screen content (e.g., scrolling within windows, dragging of windows, potentially large displacements) and 2) common encoding requirements for screen content (e.g., lossless compression for palettized content).

In a first adaptation, instead of sub-sampling the motion vector search space and doing a hierarchical search (as in some conventional camera video motion estimation algorithms), a screen capture encoder performs an expanded search with distortion calculated on a grid of sub-sampled pixel locations. In screen capture video, the path to a suitable motion vector commonly follows a random approach rather than a gradient approach (i.e., the graph for the distortion measure does not have a "bowl" shape). The distortion measure is fairly random (and indicates poor matches) across much of the motion vector search space, then suddenly improves when a good match is found. At the same time, since displacements can be very large, the search space is potentially much larger than for camera video. (In one implementation, the search space is the entire reference frame.) So, the encoder tests motion vectors in small increments in a potentially larger search space. And, for each motion vector, the encoder measures distortion for less than all locations of the region of screen content. Alternatively, the screen capture encoder uses some other search strategy to find motion vectors.

In a second adaptation, instead of using some variation of Euclidean $L^2$ norm to measure distortion (as in most conventional camera video motion estimation algorithms), the screen capture encoder uses identical pixel value matching criteria such as Hamming distance. In general, the identical pixel value matching criteria measure whether two values are equal or not equal. For a particular motion vector and region, the identical pixel value matching criteria indicate the number of pixels in the region that would require encoding by intraframe compression after motion estimation of the region with the motion vector. Specifically, the Hamming distance is the number of pixels with different values. Conversely, the identical pixel value matching criteria can be the number of pixels with identical values or another measure. The number of pixels that require encoding by intraframe compression is a good predictor of bitrate for screen capture video, especially when such pixels are losslessly but not lossy compressed. By minimizing the number of pixels that require encoding by intraframe compression (as opposed to minimizing the variance of pixels), the screen capture encoder tends to find matches that result in lower overall bitrate. Alternatively, the screen capture encoder uses some other distortion measure to evaluate the suitability of different motion vectors.

The screen capture encoder computes two-dimensional motion vectors to parameterize changes in regions of screen content from frame to frame. Computing two-dimensional motion vectors is relatively simple, and changes in screen content can often be effectively modeled as simple translational motion. Alternatively, a screen capture encoder uses some other type of motion data/motion model to parameterize changes in regions of screen content from frame to frame. The regions of screen content for which motion estimation/compensation is performed can be rectangular to simplify implementation, or the regions can have an arbitrary configuration. Moreover, while the reference frame for motion estimation/compensation is the previous frame in the sections below, one or more other frames could instead be used as reference frames.

In several of the following sections, when motion estimation/compensation is used for a current frame, a pixel map indicates which pixels of the current frame are identical to the reference frame, which pixels are motion estimated/compensated, and which pixels are changed (and hence coded by intraframe compression). Alternatively, the encoder and decoder use some other mechanism to indicate which regions of screen content are motion estimated/compensated.

The described embodiments include numerous different motion estimation and compensation techniques. While these techniques are described as part of a single system, the techniques can also be used separately, potentially in combination with other techniques.

Several of the following sections describe a screen capture encoder and decoder that perform motion estimation/compensation for screen capture video. Alternatively, another type of encoder, decoder or other tool uses one or more of the described motion estimation or compensation techniques on screen capture content or some other category of content.

I. Computing Environment

FIG. 2 illustrates a generalized example of a suitable computing environment (200) in which described embodiments may be implemented. The computing environment (200) is not intended to suggest any limitation as to scope of use or functionality of the invention, as the present invention may be implemented in diverse general-purpose or special-purpose computing environments.

With reference to FIG. 2, the computing environment (200) includes at least one processing unit (210) and memory (220). The processing unit (210) executes computer-executable instructions and may be a real or a virtual processor. In a multi-processing system, multiple processing units execute computer-executable instructions to increase processing power. The memory (220) may be volatile memory (e.g., registers, cache, RAM), non-volatile memory (e.g., ROM, EEPROM, flash memory, etc.), or some combination of the two. The memory (220) stores software (280) implementing a screen capture encoder/decoder with motion estimation/compensation for screen capture video.

The computing environment (200) also includes a display card (230). The display card (230) (alternatively called the video card, graphics card, graphics output device, display adapter, video graphics adapter, etc.) delivers output to a visual display unit such as a computer monitor. The display card (230) includes a frame buffer that stores pixel information for display on a screen. The frame buffer is often some type of RAM on the display card (230), but can instead be some other kind of memory and/or not physically located on the display card itself. The display card (230) can include a graphics processor, graphics accelerator, and/or other specialized display hardware.

Typically, operating system software (not shown) provides an operating environment for other software executing in the computing environment (200), and coordinates activities of the components of the computing environment (200). In addition, display driver software allows access to various features of the display card (230). The display driver software can work in conjunction with one or more layers of operating system software through which access to the features of the display card (230) is exposed. For example, through such features, a screen capture tool might retrieve pixel information from the frame buffer of the display card (230) for screen content currently displayed on a screen of a visual display unit.

A computing environment may have additional features. For example, the computing environment (200) includes storage (240), one or more input devices (250), one or more output devices (260), and one or more communication connections (270). An interconnection mechanism (not shown) such as a bus, controller, or network interconnects the components of the computing environment (200).

The storage (240) may be removable or non-removable, and includes magnetic disks, magnetic tapes or cassettes, CD-ROMs, CD-RWs, DVDs, or any other medium which can be used to store information and which can be accessed within the computing environment (200). The storage (240) stores instructions for the software (280) implementing a screen capture encoder/decoder with motion estimation/compensation for screen capture video.

The input device(s) (250) may be a touch input device such as a keyboard, mouse, pen, or trackball, a voice input device, a scanning device, sound card, TV tuner/video input card, or other device that provides input to the computing environment (200).

The output device(s) (260) may be a visual display unit, printer, speaker, CD-writer, or other device that provides output from the computing environment (200). A visual display unit presents screen content based upon output delivered from the display card (230).

The communication connection(s) (270) enable communication over a communication medium to another computing entity. The communication medium conveys information such as computer-executable instructions, compressed captured screen area information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The invention can be described in the general context of computer-readable media. Computer-readable media are any available media that can be accessed within a computing environment. By way of example, and not limitation, with the computing environment (200), computer-readable media include memory (220), storage (240), communication media, and combinations of any of the above.

The invention can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various implementations. Computer-executable instructions for program modules may be executed within a local or distributed computing environment.

For the sake of presentation, the detailed description uses terms like "capture," "encode," and "decode" to describe computer operations in a computing environment. These terms are high-level abstractions for operations performed by a computer, and should not be confused with acts performed by a human being. The actual computer operations corresponding to these terms vary depending on implementation.

II. Exemplary Screen Capture Encoder and Decoder

Figure 3:
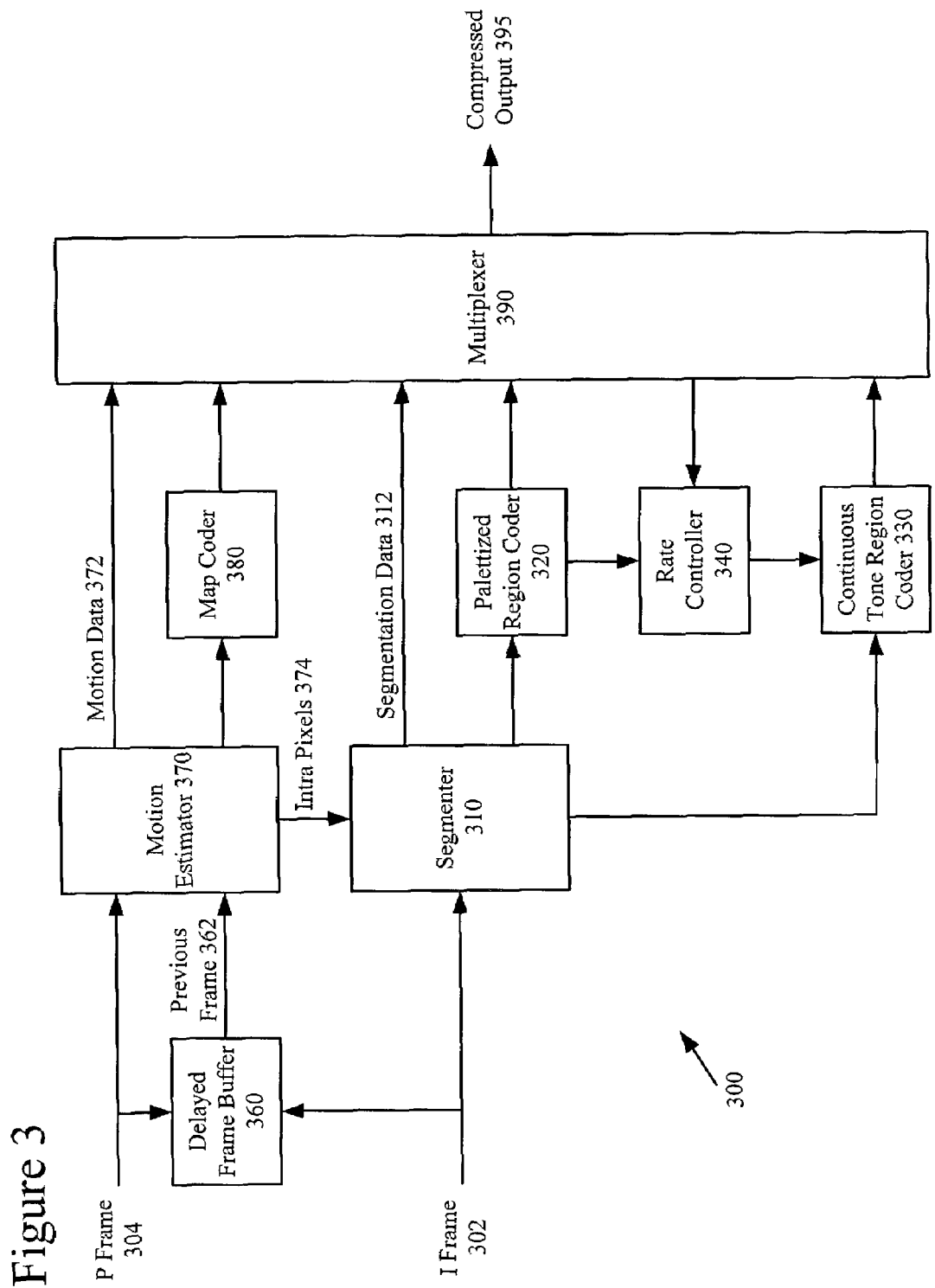
FIGS. 3 and 4 are block diagrams of an exemplary screen capture encoder and decoder, respectively, in which described embodiments may be implemented.
Figure 4:
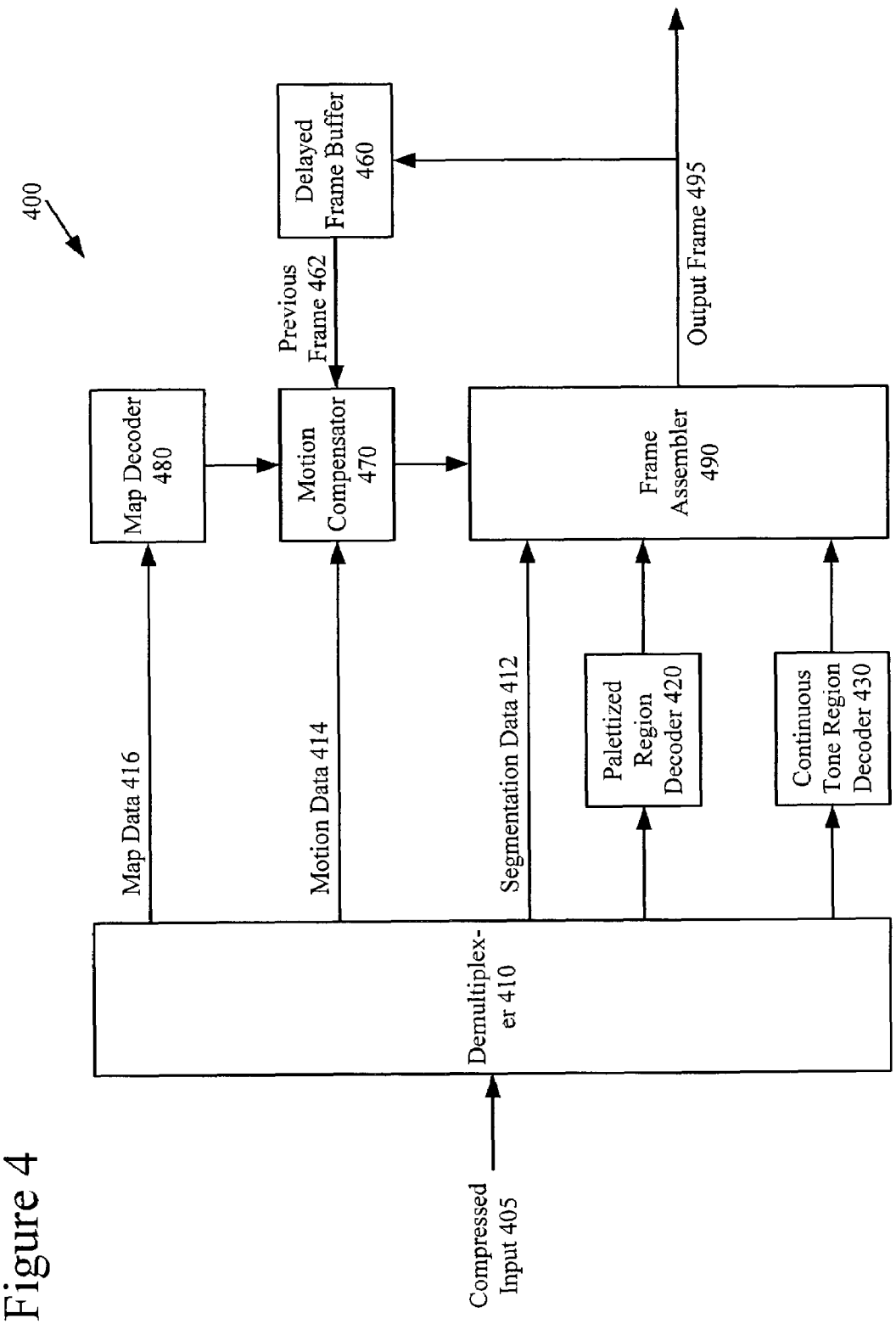

FIGS. 3 and 4 are block diagrams of an exemplary screen capture encoder (300) and an exemplary screen capture decoder (400), respectively. In various respects, the encoder (300) and decoder (400) are customized to compress/decompress frames of pixel information for screen areas captured from the screen of a visual display unit. Alternatively, the encoder (300) and decoder (400) compress/decompress frames of pixel information for other types of content.

In a common screen capture scenario, a screen capture module (not shown) captures screen areas that the encoder (300) compresses as a series of frames. The screen capture module can be a standalone software application, a feature of a multimedia production or encoding package, a plug-in, or some other form of product. The captured screen areas can show an entire screen (for example, an entire desktop environment), a selected window, or an arbitrary region of the desktop environment. In general, a screen area depicts some or all of the screen content presented or prepared for presentation in a desktop environment or other graphical user interface for a computer system. To capture a screen area, the screen capture module uses a Bit Block Transfer or other screen capture technique, such as one described in U.S. patent application Ser. No. 10/160,697, filed May 30, 2002, entitled "Reducing Information Transfer in Screen Capture Series," hereby incorporated by reference.

The screen capture module typically lets a user set high-level options for a capture session (e.g., media sources and types, quality, resultant bitrate, buffer size, and output stream or file location). The screen capture module can also present low-level options to the user, such as capture frame rate, output resolution, time distortion (e.g., slow motion). The capture frame rate for a series of screen areas may be fixed for the duration of the series or vary during screen capture for all or part of a screen area so as to increase temporal resolution when possible and decrease temporal resolution (even skipping frames) if necessary.

The relationships shown in FIGS. 3 and 4 indicate the main flow of information in the encoder and decoder; other relationships are not shown for the sake of simplicity. Depending on implementation and the type of compression/decompression desired, modules of the encoder or decoder can be added, omitted, split into multiple modules, combined with other modules, and/or replaced with like modules. In alternative embodiments (some of which are described below), an encoder or decoder includes different modules and/or other configurations of modules.

A. Exemplary Screen Capture Encoder

The exemplary screen capture encoder (300) includes a segmenter (310), a palettized region coder (320), a continuous tone region coder (330), a rate controller (340), a delayed frame buffer (360), a motion estimator (370), a map coder (380), and a multiplexer (390). With these modules, the encoder (300) performs live or off-line compression of a series of frames. The encoder (300) multiplexes the output of the various modules to produce a bitstream of compressed output (395) in system memory, a file in storage, one or more streams over a network, or another location. The input and output formats of the encoder (300) vary by implementation. For additional detail about particular modules of the encoder (300) in certain implementations, see the applications referenced in the Related Application Data section.

The encoder (300) compresses the first frame of the series as an I Frame (302) (alternatively called a key frame, intra frame, or intra-coded frame), using only information within the I Frame (302) to compress the I Frame (302). The encoder (300) compresses each of one or more subsequent frames of the series as a P Frame (304) (alternatively called a predicted frame, inter frame, or inter-coded frame). Each P Frame (304) may be compressed with reference to one or more other frames (for example, the previous frame). Also, the encoder (300) can compress a subsequent frame as an I Frame (304) periodically, as necessary (e.g., when the frame changes dramatically relative to the previous frame), or on some other basis.

For compression of an I Frame (302), the encoder (300) provides the I Frame (302) to the segmenter (310). The segmenter (310) partitions the I Frame (304) into continuous tone regions and palettized regions. The continuous tone regions are characterized by a large color space (e.g., 24 bits per pixel) and gradually varying color values from pixel to pixel. In a captured screen area, the continuous tone regions might include a background wallpaper photograph or an image in a web browser. On the other hand, the palettized regions are characterized by a smaller color space (e.g., 8 bits per pixel, often indices to a color palette), long runs of identical color values, and sharply contrasting changes in color value when changes occur. In a captured screen area, the palettized regions might include text on a solid background, icons, buttons, toolbars, menus, or other user interface features. The segmenter (310) may also segment graphical text from continuous tone regions, so that the text can be compressed losslessly, even if the encoder (310) introduces distortion in the continuous tone regions to reduce bitrate. Alternatively, the segmenter (310) uses other segmentation techniques and/or segments regions according to different or additional criteria.

The segmenter (310) transmits segmentation data (312) to the multiplexer (390) describing the segmented regions. The segmentation data (312) can be compressed in a lossy or lossless manner. The segmenter (310) also transmits pixel information for the regions of the I Frame (302) to the palettized region coder (320) and the continuous tone region coder (330).

The palettized region coder (320) compresses the palettized regions using techniques adapted to the characteristics of palettized screen content. Lossy compression techniques introduce distortion that can obliterate fine detail such as text and button graphics in palettized regions. Accordingly, the palettized region coder (320) uses a lossless compression technique such as run length coding, arithmetic coding, dictionary coding, variable-to-variable length coding, Huffman coding, LZ coding, a combination of the above, or some other entropy coding technique. Alternatively, the palettized region coder (320) uses compression techniques different than or in addition to the foregoing techniques to compress the palettized regions.

The palettized region coder (320) transmits data such as the pixel information and side information for the palettized regions to the multiplexer (390).

The continuous tone region coder (330) compresses the continuous tone regions using techniques adapted to the characteristics of continuous tone screen content. The continuous tone region coder (330) uses a combination of lossy and lossless compression techniques. Ideally, the continuous tone region coder (330) uses lossless compression or introduces imperceptible distortion, but the bitrate for such compressed output is often too high. In many scenarios, output must be compressed to a lower bitrate, or available bits are better spent on higher frame rate to smooth changes in palettized regions from frame to frame. To reduce bitrate for the continuous tone regions at some cost to quality, the continuous tone region coder (330) uses some form of quantization (e.g., scalar or vector, uniform or non-uniform, and static or adaptive). Quantization introduces irreversible loss of information, but can also allow the encoder (300) to regulate quality and bitrate. The quantization potentially follows a frequency transformation or decomposition (e.g., DCT, FFT, MLT, wavelets, subband coding) of the pixel information for the continuous tone regions, and can incorporate perceptual modeling. After the quantization, the continuous tone region coder (330) uses some form of lossless compression such as run length coding, arithmetic coding, dictionary coding, variable-to-variable length coding, Huffman coding, LZ coding, a combination of the above, or some other entropy coding technique. Alternatively, the continuous tone region coder (330) uses compression techniques different than or in addition to the foregoing techniques to compress the continuous tone regions.

The continuous tone region coder (330) transmits data such as pixel information and side information for the continuous tone regions to the multiplexer (390).

The rate controller (340) regulates the overall bitrate of the compressed output (395) by controlling the quantization of the continuous tone regions in the continuous tone region coder (330). The rate controller (340) receives information from other modules of the encoder (300), including the bitrate of the palettized regions for the frame and the current fullness of a virtual buffer in the multiplexer (390). Using this information and other information for the encoding session (e.g., average bits per pixel for I Frame or P Frame, quality criteria), the rate controller (340) budgets bits for the continuous tone regions and transmits the bit budget to the continuous tone region coder (330). The rate controller (340) seeks to satisfy numerous bitrate and quality constraints, both instantaneous and long term. For example, the rate controller (340) seeks to avoid virtual buffer underflow and overflow, maintain relatively constant bitrate over time, allocate bits for continuous tone regions fairly from frame to frame, and maintain at least a minimum quality for continuous tone regions. The continuous tone region coder (330) tests one or more quantization levels, and the results are evaluated in terms of bitrate and quality. When the quality of the continuous tone regions falls below a certain point, the encoder (300) may drop a frame or the continuous tone regions rather than send poor quality information. Alternatively, the rate controller (340) uses techniques different than or in addition to the foregoing techniques to control the rate and/or quality of some or all types of pixel information.

The multiplexer (390) multiplexes the information received from the various modules of the encoder (300), producing output (395) in a format that the decoder (400) recognizes. The multiplexer (390) may also receive other information not shown in FIG. 3, such as frame header information, from the various modules of the encoder (300) or elsewhere. The multiplexer (390) includes a virtual buffer, which stores a predetermined duration of compressed information (e.g., 5 seconds) in order to smooth over short-term fluctuations in bitrate due to complexity changes or other characteristics of the content or encoder (300). The virtual buffer outputs data at a constant or relatively constant bitrate (e.g., to a file or stream). The current fullness of the virtual buffer, the rate of change of fullness of the buffer, and other characteristics of the buffer can be used by the rate controller (340).

For compression of a P Frame (304), the encoder (300) provides the P Frame (304) to the motion estimator (370). The motion estimator (370) compares the P Frame (304) to the previous frame (362) buffered in the delayed frame buffer (360), which can be an I Frame or P Frame. In a pixel-by-pixel map for the P Frame (304), the motion estimator (370) indicates which of the pixels of the P Frame (304) are identical in value to the pixels at the same locations in the previous frame (362). For regions of non-identical pixels in the P Frame (304), the motion estimator (370) computes motion data (372) (e.g., motion vector(s)) describing motion relative to the previous frame (362). To compute the motion data (372) the motion estimator searches in the previous frame (362) for regions that match the regions of non-identical pixels in the P frame (304). One match criterion is the number of exactly matching pixels. In the map for the P Frame (304), the motion estimator (370) indicates which of the pixels of the P Frame (304) should be reconstructed by motion compensation using the motion data (372). If the motion data includes multiple motion vectors, the map indicates which pixels should be reconstructed using which motion vector. The remaining pixels of the P Frame (304) are intra pixels—neither identical in value to pixels at the same locations in the previous frame (362) nor predicted by the motion estimation. Alternatively, the motion estimator (370) uses techniques different than or in addition to the foregoing techniques to predict values for P Frames from reference frames and indicate the results.

The motion estimator (370) transmits the pixel-by-pixel map to the map coder (380). The motion estimator (370) also transmits pixel information for the intra pixels (374) of the P Frame (304) to the segmenter (310).

The map coder (380) compresses the pixel-by-pixel map for the P Frame (304) using a lossless compression technique such as run length coding, arithmetic coding, dictionary coding, variable-to-variable length coding, Huffman coding, LZ coding, a combination of the above, or some other entropy coding technique. Alternatively, the map coder (380) uses compression techniques different than or in addition to the foregoing techniques to compress the pixel-by-pixel map. For example, in one alternative embodiment, the map coder compresses the map using lossy compression as well as lossless compression. The map coder (380) transmits data such as the compressed map to the multiplexer (390). In one implementation, the encoder (300) uses the same module for the palettized region coder (320) and the map coder (380).

The segmenter (310), the palettized region coder (320), the continuous tone region coder (330), and the rate controller (340) perform the operations described above to compress the intra pixels (374) of the P Frame (304).

In alternative embodiments, an encoder with different modules and/or other configurations of modules performs the described motion estimation techniques. For example, although the exemplary encoder (300) includes the segmenter (310), palettized region coder (320), continuous tone region coder (330), and rate controller (340), in an alternative embodiment, an encoder performs motion estimation for screen capture video without rate control and/or without encoding palettized regions and continuous tone regions with different coders.

B. Exemplary Screen Capture Decoder

The exemplary screen capture decoder (400) includes a demultiplexer (410), a palettized region decoder (420), a continuous tone region decoder (430), a frame assembler (440), a delayed frame buffer (460), a motion compensator (470), and a map decoder (480). With these modules, the decoder decompresses a series of frames for playback. For additional detail about particular modules of the decoder (400) in certain implementations, see the applications referenced in the Related Application Data section.

The demultiplexer (410) demultiplexes the compressed input (405), producing outputs for the various modules of the decoder (400). In addition to the outputs shown, the demultiplexer (410) may produce other outputs, such as frame header information for the frame assembler (490).

For decompression of an I Frame, the palettized region decoder (420) decompresses the palettized regions of the frame, for example, reversing the compression performed in the palettized region coder (320). The palettized region decoder (420) transmits the decompressed information for the palettized regions to the frame assembler (490).

The continuous tone region decoder (430) decompresses the continuous tone regions of the frame, producing reconstructed versions. For example, the continuous tone region decoder (430) reverses lossless compression performed in the continuous tone region coder (330) and then reverses any quantization and frequency transform/decomposition operations performed in the continuous tone region coder (330), typically performing the inverse of the operation. The continuous tone region decoder (420) transmits the decompressed information for the continuous tone regions to the frame assembler (490).

The frame assembler (490) receives the segmentation data (412) from the demultiplexer (410) as well as the decompressed information from the palettized region decoder (420) and the continuous tone region decoder (430). Using this information, the frame assembler (490) constructs the I Frame. For example, the frame assembler (490) uses the segmentation data (412) to determine where to place the decompressed pixel information for the palettized regions and continuous tone regions in the I Frame. The frame assembler (490) then outputs a frame (495) for playback. The delayed frame buffer (460) can store the output frame (495) for use as a reference frame for the following frame.

For decompression of a P Frame, the map decoder (480) decompresses the map data (416), for example, reversing the compression performed in the map coder (380). The map decoder (480) transmits data such as the decompressed map to the motion compensator (470). In one implementation, the decoder (400) uses the same module for the palettized region decoder (420) and the map decoder (480).

The motion compensator (470) receives the motion data (414) from the demultiplexer (410) as well as the decompressed map from the map decoder (480). Using the decompressed map and the previous frame (462), the motion compensator (470) constructs the regions of pixels of the P Frame that are identical in value to the pixels at the same locations in the previous frame (462). Using the decompressed map, the motion data (414), and the previous frame (462), the motion compensator (470) constructs the motion-compensated regions of pixels of the P Frame. Alternatively, the motion compensator (470) uses techniques different than or in addition to the foregoing techniques to compensate for prediction in the encoder. The motion compensator (470) transmits the constructed regions of the P Frame to the frame assembler (490).

The palettized region decoder (420) and continuous tone region decoder (430) decompress pixel information for the intra pixels of the P Frame, using the techniques described above.

The frame assembler (490) receives the decompressed pixel information for the intra pixels, the segmentation data (412) from the demultiplexer (410), and the constructed regions from the motion compensator (470). Using this information, the frame assembler (490) constructs the P Frame. For example, the frame assembler (490) uses the segmentation data (412) to determine how to place the decompressed pixel information for the palettized regions and continuous tone regions of the intra pixels of the P Frame around the constructed regions from the motion compensator (470). The frame assembler (490) then outputs a frame (495) for playback, which can be stored in the delayed frame buffer (460) for use as a reference frame.

In alternative embodiments, a decoder includes different modules and/or other configurations of modules. For example, although the exemplary decoder (400) includes the palettized region decoder (420) and continuous tone region decoder (430), in an alternative embodiment, a decoder performs motion compensation for screen capture video without decoding palettized regions and continuous tone regions in different decoders.

III. Motion Estimation for Screen Capture Video

Figure 5:
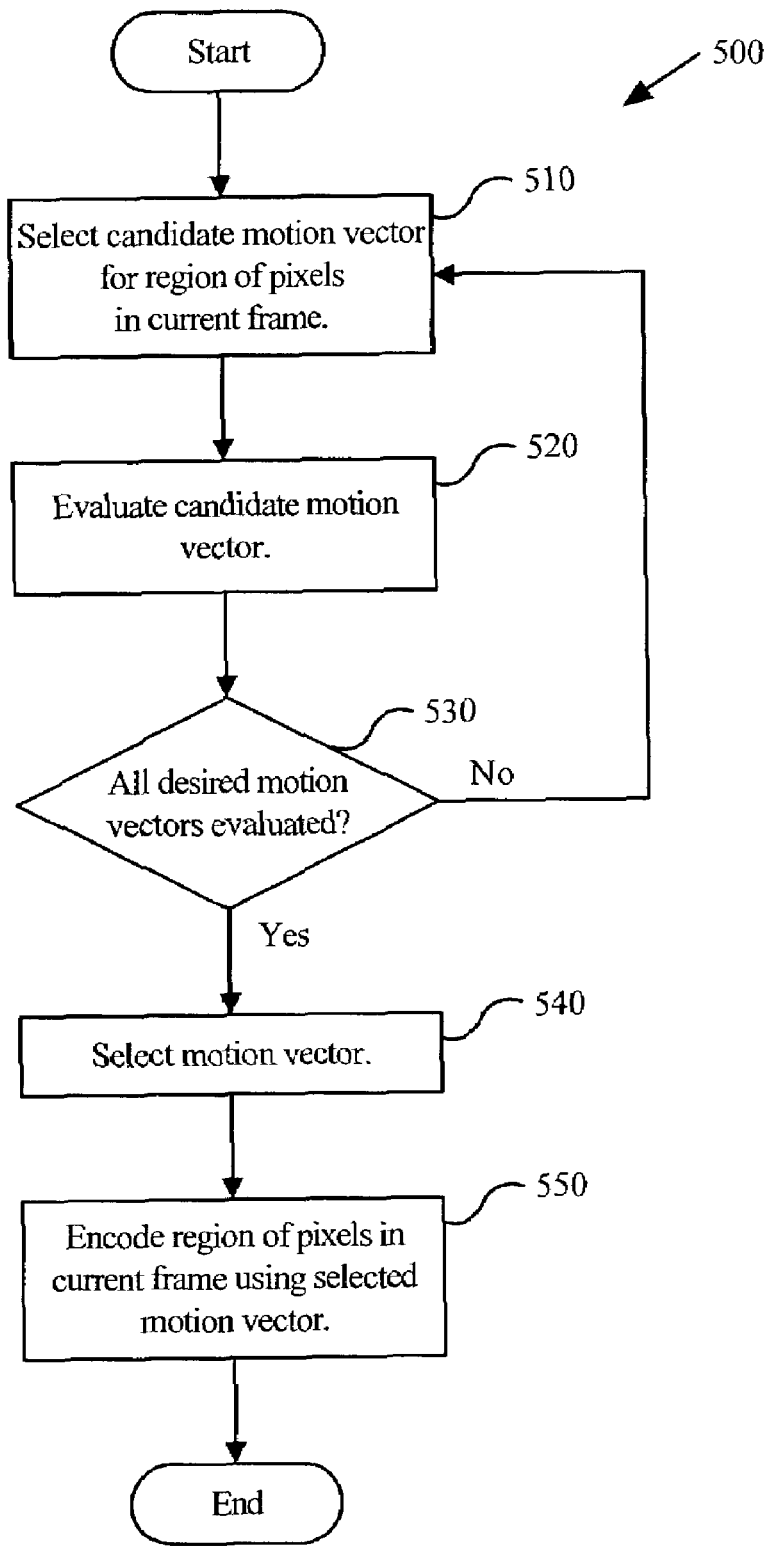
FIGS. 5 and 6 are flowcharts showing techniques for motion estimation for screen capture video.
Figure 6:
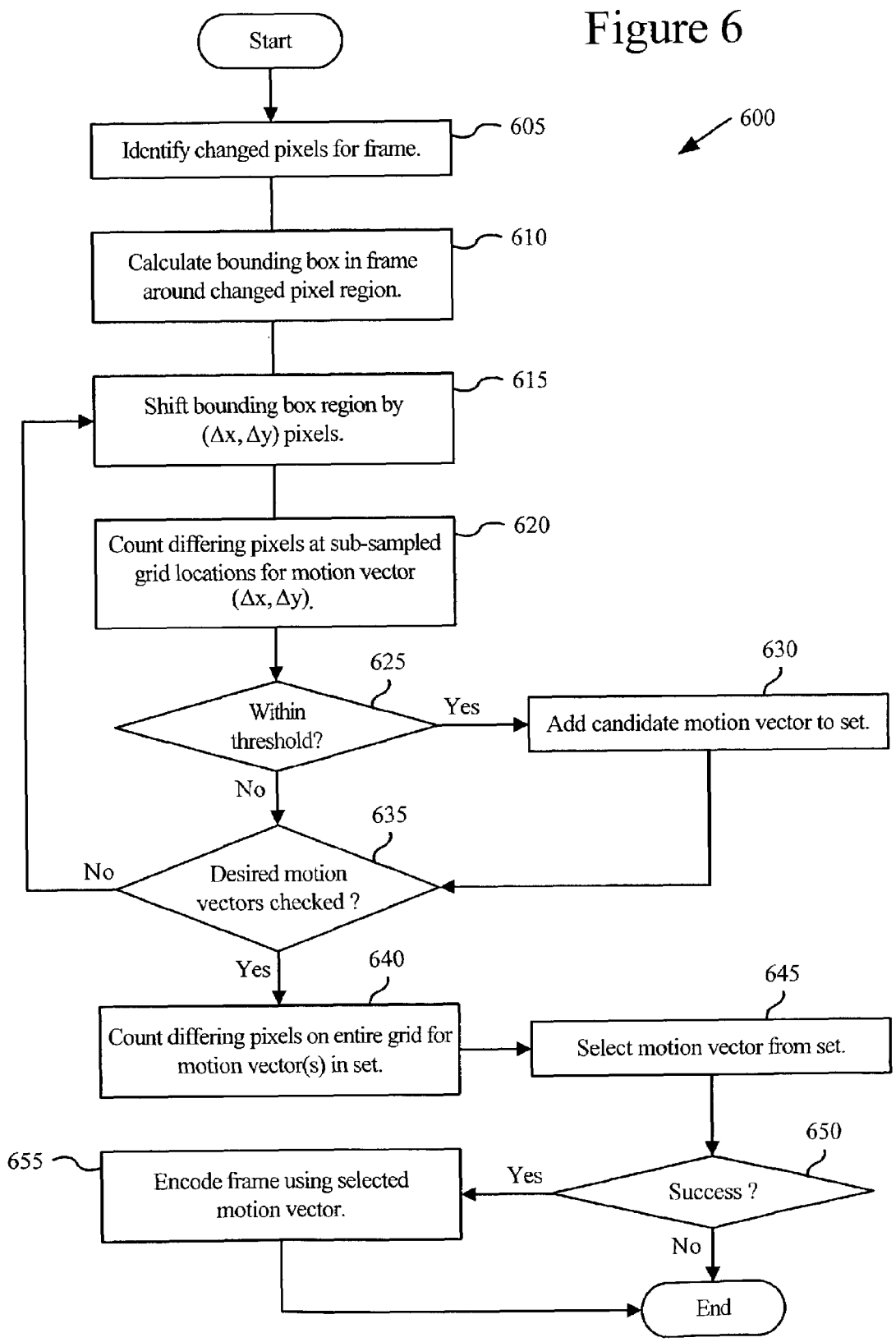

FIGS. 5 and 6 show techniques (500, 600) for performing motion estimation for screen capture video. An encoder such as the screen capture encoder described with reference to FIG. 3 performs the motion estimation techniques (500, 600).

For the sake of simplicity, FIGS. 5 and 6 do not show how the techniques (500, 600) relate to the rest of the encoding/decoding process. Moreover, depending on implementation, the timing and order of operations in the techniques (500, 600) can vary. For example, in some implementations, the placement of conditional logic is rearranged or the ordering of various operations is switched.

A. Generalized Motion Estimation Technique

FIG. 5 shows a generalized technique (500) for performing motion estimation for screen capture video. The encoder selects (510) a candidate motion vector for a region of pixels in the current frame. For example, the encoder selects (510) the next motion vector from the set of possible motion vectors according to the ordering of a motion vector search pattern. Depending on implementation, the motion vector search pattern prioritizes motion vectors in certain directions, distances, and/or patterns to increase the chance of finding a suitable motion vector early in the search pattern. The search pattern starts from around the point of no displacement (no motion). Or, the search pattern starts from a displacement predicted to yield a suitable motion vector, for example, the displacement for the motion vector used in the previous frame (assuming relatively constant motion). In one implementation, the motion vector search area spans the entire reference frame, but other fixed or varying sizes are possible.

Conceptually, a two-dimensional motion vector specifies a displacement ($\Delta x$, $\Delta y$) from the location (x, y) of the current frame region. The current frame region can then be compared to a reference frame region at the displaced location (x+$\Delta x$, y+$\Delta y$) in the reference frame.

The encoder evaluates (520) the candidate motion vector to determine the fitness of the candidate motion vector for encoding the frame. For example, the encoder measures the Hamming distance between pixels in the current frame region and pixels in the reference frame region specified by the motion vector. Alternatively, the encoder uses some other measure, by itself or in combination with Hamming distance, to determine the fitness of the candidate motion vector.

The encoder determines (530) whether it has evaluated all desired motion vectors. If not, the encoder selects (510) another candidate motion vector for the region of screen content in the current frame. For example, the encoder stops evaluating motion vectors when the end of the motion vector search pattern is reached. The encoder might also stop evaluating motion vectors after finding a motion vector that is perfect or "good enough" according to some criteria.

After the encoder stops evaluating motion vectors, the encoder selects (540) a motion vector. At this point, the encoder can select (540) the motion vector that was previously evaluated to be the best. Or, before selecting (540), the encoder can perform additional evaluations on some subset of candidate motion vectors screened out as promising according to some threshold determination in the previous evaluations.

The encoder then encodes (550) the region of pixels in the current frame using the selected motion vector. Afterwards, the encoder can continue with motion estimation for another region of pixels in the current frame or for the next frame.

B. Detailed Motion Estimation Technique

FIG. 6 shows a more detailed technique (600) for performing motion estimation for screen capture video in one implementation. The encoder identifies (605) pixels in the current frame that have changed relative to the previous frame. For example, the encoder compares all pixels in the current frame with pixels at the same locations in the previous frame to determine which pixels have changed (the intra pixels, before motion estimation).

Before proceeding any further, the encoder can check the feasibility (not shown in FIG. 6) of performing motion estimation at all for the current frame. For example, suppose $D_{orig}$ is the number of pixels in the current frame that have changed relative to the previous frame. The encoder checks whether $D_{orig}$ is above some threshold for the current frame (e.g., at least 1% of the pixels of the current frame). If so, the encoder performs motion estimation. If not, the encoder skips motion estimation.

The encoder calculates (610) a bounding box around a group of changed pixels in the current frame. The bounding box can be a rectangle or some other configuration of pixels. The encoder then begins evaluating candidate motion vectors. Many conventional camera video motion estimation algorithms perform motion estimation for all the blocks of a current frame according to a fixed block pattern. Compared to such algorithms, estimating motion for groups of changed pixels in bounding boxes can improve the efficiency of motion estimation for screen capture video, for example, by searching for fewer motion vectors and reducing the likelihood that blocks include changed pixels with different motions.

To evaluate a candidate motion vector (Δx, Δy), the encoder shifts (615) the bounding box by offsets of Δx and Δy pixels along the x and y axes, respectively. This sets up a comparison with a corresponding region of the reference frame at the shifted location. For a search of the motion vector space at integer pixel increments, the values of Δx and Δy are integers. Alternatively, Δx and Δy have non-integer values.

Figure 7:
FIG. 7 is a diagram showing a motion vector search pattern for motion estimation in one implementation.

FIG. 7 shows an example of a motion vector search pattern (700). In various respects, the search pattern (700) facilitates early termination of the motion vector search. In screen capture video, the most common types of motion are pure horizontal motion and pure vertical motion, for example, corresponding to scrolling within a window. Accordingly, following the search pattern (700), the encoder first checks pure horizontal motion vectors (range "1") and then checks pure vertical motion vectors (range "2"). Within the pure horizontal or pure vertical motion vector range, the motion vectors for small displacements from the starting point ("X" in FIG. 7) are checked before the motion vectors for larger displacements. After pure horizontal motion and pure vertical motion, the next most common types of motion are approximately horizontal motion and approximately vertical motion. So, the encoder next checks substantially horizontal motion vectors (range "3") and substantially vertical motion vectors (range "4"). Again, within the search ranges, the encoder checks motion vectors close to the starting point before checking motion vectors further from the starting point. Finally, since small overall displacements are more likely than large overall displacements, the encoder checks the remaining motion vectors in a pattern that generally spirals away from the starting point. Alternatively, the encoder uses another motion vector search pattern.

Checking the Hamming distance for a large bounding box shifted by a candidate motion vector (Δx, Δy) involves many calculations. Moreover, for screen capture video, the motion vector search space is very large (even the entire frame). This helps to account for potentially large displacements between frames due to quick scrolling, dragging, etc., but further increases the number of calculations for Hamming distance.

Figure 8:
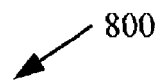
FIG. 8 is a diagram showing a grid of sub-sampled pixel locations for a distortion measure for motion estimation in one implementation.

To reduce the number of calculations, the encoder sub-samples the distortion calculation. For a candidate motion vector (Δx, Δy), the encoder checks less than all pixel locations within the bounding box for changes relative to the previous frame. In particular, the encoder counts (620) the number of differing pixels for a grid of sub-sampled pixel locations in the bounding box. FIG. 8 shows an example of a grid (800) of sub-sampled pixel locations. The encoder checks pixels at locations marked "X" in the grid (800), but does not check pixels at pixel marked "O" in the grid (800). Alternatively, the encoder checks pixels at all locations or at the locations of a grid with a different fixed or varying pattern, different density of checked locations, etc. For example, the density of checked locations in the grid can vary depending on the proportion of changed pixels in the boundary box (with fewer checked locations if more changed pixels in the boundary box, and vice versa).

The motion vector with the best sub-sampled distortion measure might not have the best overall distortion measure. Accordingly, the encoder determines (625) whether the number of differing pixels (at the sub-sampled locations) for the candidate motion vector (Δx, Δy) is within a certain threshold of the number for the best motion vector found so far. If so, the encoder adds (630) the candidate motion vector to a set of motion vectors for subsequent, full evaluation. Alternatively, the encoder uses another fixed or varying threshold to decide when to add motion vectors to the set.

The encoder determines (635) whether to evaluate any more motion vectors. If so, the encoder shifts (615) the bounding box by the offsets for the next candidate motion vector and continues. On the other hand, the encoder might stop evaluating motion vectors if the last motion vector in the motion vector search pattern has been checked, if a "perfect" motion vector has been found, if enough "good" motion vectors have been found, or if some other termination condition applies. For example, to determine whether to stop, the encoder compares the sub-sampled distortion measure for a motion vector to some fixed or varying threshold, or checks for large, contiguous areas of perfectly matching pixels according to the sub-sampled distortion measure. Or (skipping the set of candidate motion vectors), the encoder checks the non-sub-sampled distortion for a motion vector that appears to be particularly promising. The encoder then compares the non-sub-sampled distortion to some threshold or checks for large, contiguous regions of perfectly matching pixels to determine whether to stop.

After the encoder stops evaluating candidate motion vectors, the encoder checks the overall distortions for the candidate motion vectors in the set of promising motion vectors. In particular, for a candidate motion vector in the set, the encoder counts (640) the number of differing pixels for the entire (non-sub-sampled) grid of pixel locations in the bounding box. Again, the encoder can check each motion vector in the set to find the best one, or the encoder can stop after finding a motion vector that is perfect or good enough by some criteria. From the set of candidate motion vectors, the encoder selects (645) a motion vector for encoding the pixels in the bounding box.

The encoder then determines (650) whether motion estimation succeeded for the current frame. For the motion vector finally selected by the encoder, the encoder evaluates whether the benefits of motion estimation exceed the costs. For example, suppose $D_{min}$ is the number of intra pixels after motion estimation with the motion vector selected by the encoder. If $D_{orig}$ is more than some threshold for the current frame (e.g., at least 10% of the pixels of the current frame), and if $D_{min}$ is some large proportion (e.g., 90%) of $D_{orig}$, then the encoder decides not to use motion estimation. If the encoder does decide to use motion estimation, the encoder encodes (655) the current frame using the selected motion vector. Alternatively, the encoder uses some other criteria to determine (650) whether motion estimation succeeded for the current frame.

Subsequently, the encoder repeats the motion estimation technique (600) to find a motion vector for another group of changed pixels in the current frame (with another bounding box). Or, the encoder repeats the motion estimation technique (600) to find a motion vector for changed pixels the next frame.

C. Example

FIGS. 9a, 9b, 10, and 11 show an example of motion estimation according to the technique (600) of FIG. 6. In the example, motion estimation improves the efficiency of compression of screen capture video in which a window is dragged between two frames.

Figure 9B:
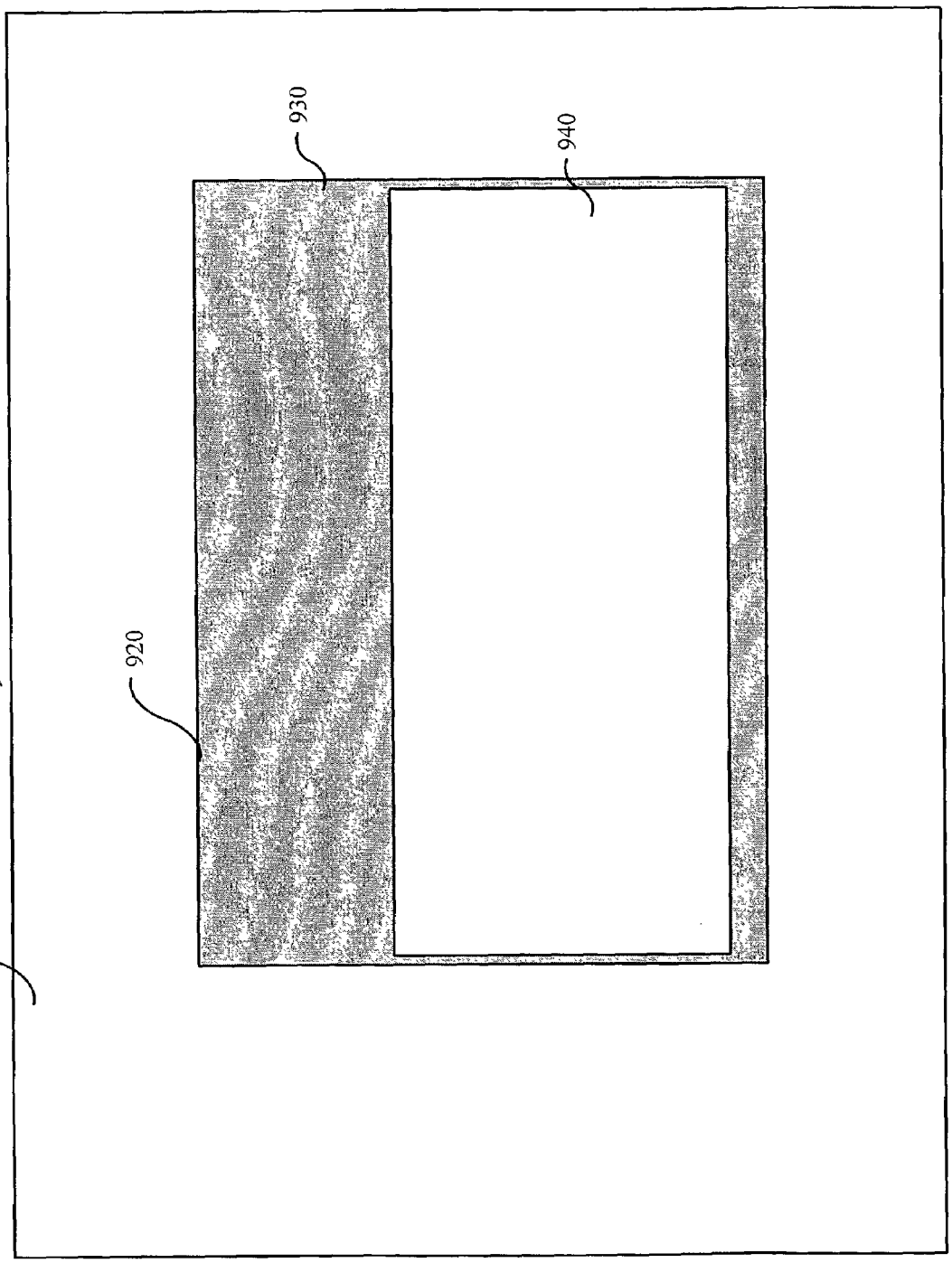

FIG. 9a shows a simplified version of a captured screen frame (900) of a computer desktop environment. For the sake of presentation, FIG. 9a omits the details of the content of the frame (900). Generally corresponding to the capture screen area (100) of FIG. 1a, the frame (900) includes a background (910) of a continuous tone image (not shown) and a window (920). The window (920) includes a gray border region (930) (detail omitted) and a single-tone white center area (940). FIG. 9b shows a simplified version of a subsequent captured screen frame (901) in which the window (920) from the previous frame (900) has been dragged by a user to a new location, exposing a previously hidden portion of the background (910).

FIG. 10 shows a pixel map (1000) illustrating whether pixels have changed or not changed at locations in the second frame (901) relative to the previous frame (900). In the pixel map (1000), the shaded regions (1010-1013) represent pixels that have not changed in value. A first shaded region (1010) represents pixels of the background (910) that are identical (same value, same content) in the two frames. In addition, several shaded regions (1011-1013) represent pixels within the window (920) that have changed locations in the two frames, but happen to have the same value before and after (different content, same value). This is fairly common if the moved regions include palettized content of uniform color.

The white regions (1020-1023) represent pixels that have changed in value. The first white region (1020) represents pixels of the background (910) exposed when the window (920) is dragged. The second white region (1021) represents pixels for which the border region (930) of the window (920) in the second frame (901) replaced center area (940) pixels in the previous frame (900). The third white region (1022) represents pixels of the window (920) in the second frame (901) that overlay parts of the background (910) shown in the first frame (900). The fourth white region (1023) represents pixels for which the center area (940) of the window (920) in the second frame (901) replaced border region (930) pixels in the previous frame (900).

Using the technique (600) of FIG. 6, the encoder finds a motion vector that parameterizes the motion of the window (920) between the first frame (900) and the second frame (901).

Figure 11:
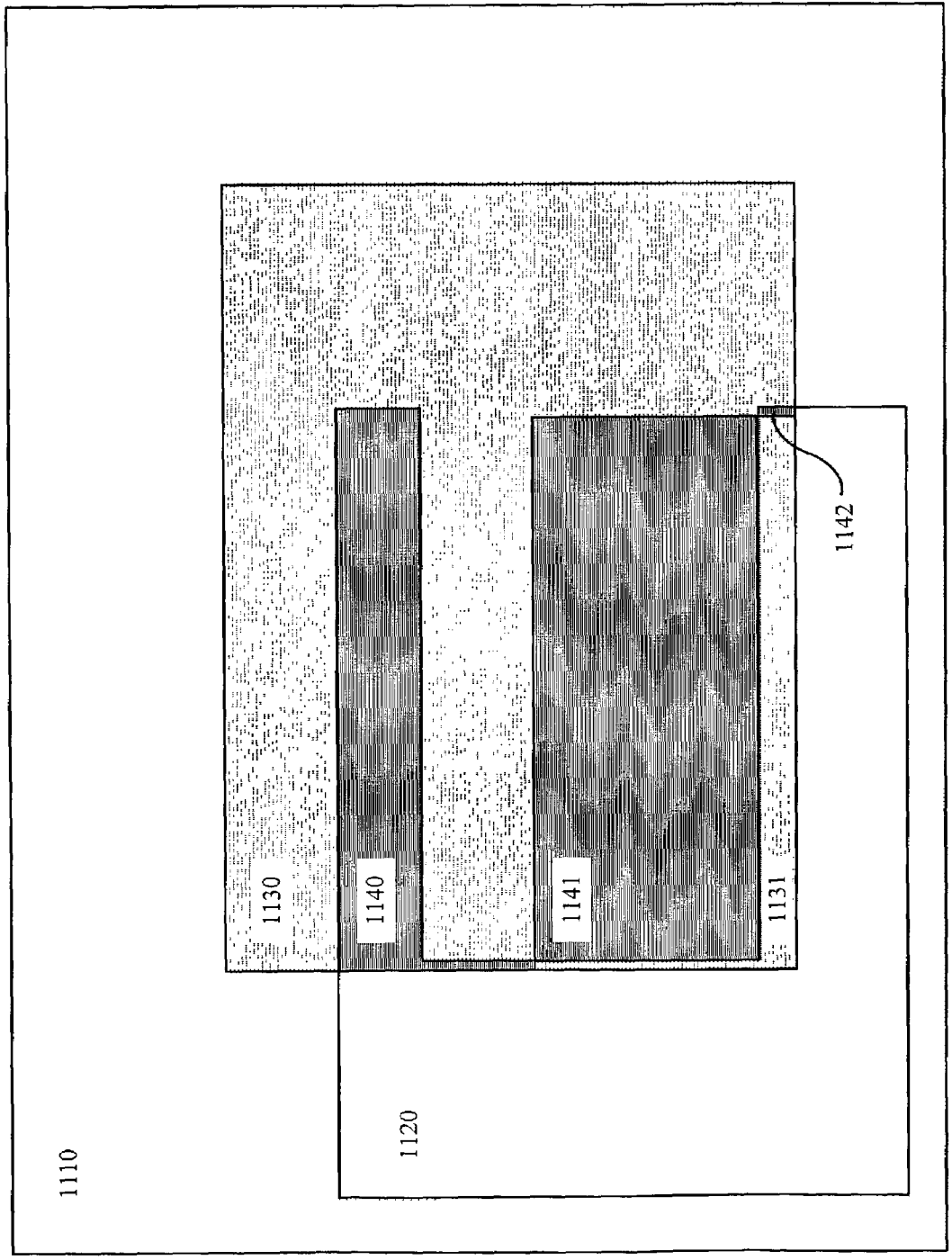
FIG. 11 is a diagram of a pixel map following motion estimation between the capture screen frames of FIGS. 9a and 9b.

FIG. 11 shows a pixel map (1100) following motion estimation for the window (920) between the first frame (900) and the second frame (901).

The lightly shaded region (1110) represents pixels that did not change between the two frames. These pixels are parts of the background (910) that are identical (same value, same content) in the two frames.

The white region (1120) represents intra pixels—pixels that changed between the two frames but were not predicted with motion estimation. These pixels are newly exposed parts of the background (910).

The medium shaded regions (1130, 1131) represent pixels that changed between the two frames but were motion estimated (the same content at a shifted location). These pixels correspond to parts of the dragged window (920).

Finally, the dark shaded regions (1140, 1141) represent pixels that did not change between the two frames, but could also be predicted by motion estimation. These pixels correspond to parts of the dragged window (920). Depending on the relative efficiencies (e.g., coding of the pixel map), the encoder can send the pixels of the dark shaded regions (1140, 1141) as identical pixels or motion estimated pixels. For example, the encoder can choose to send the pixels in the dark shaded regions (1140, 1141) as identical pixels or motion estimated pixels depending on which way results in lower bitrate for the pixels (a closed loop solution), or depending on the size or regularity of the resulting identical pixel or motion estimated pixel regions.

IV. Motion Compensation for Screen Capture Video

Figure 12:
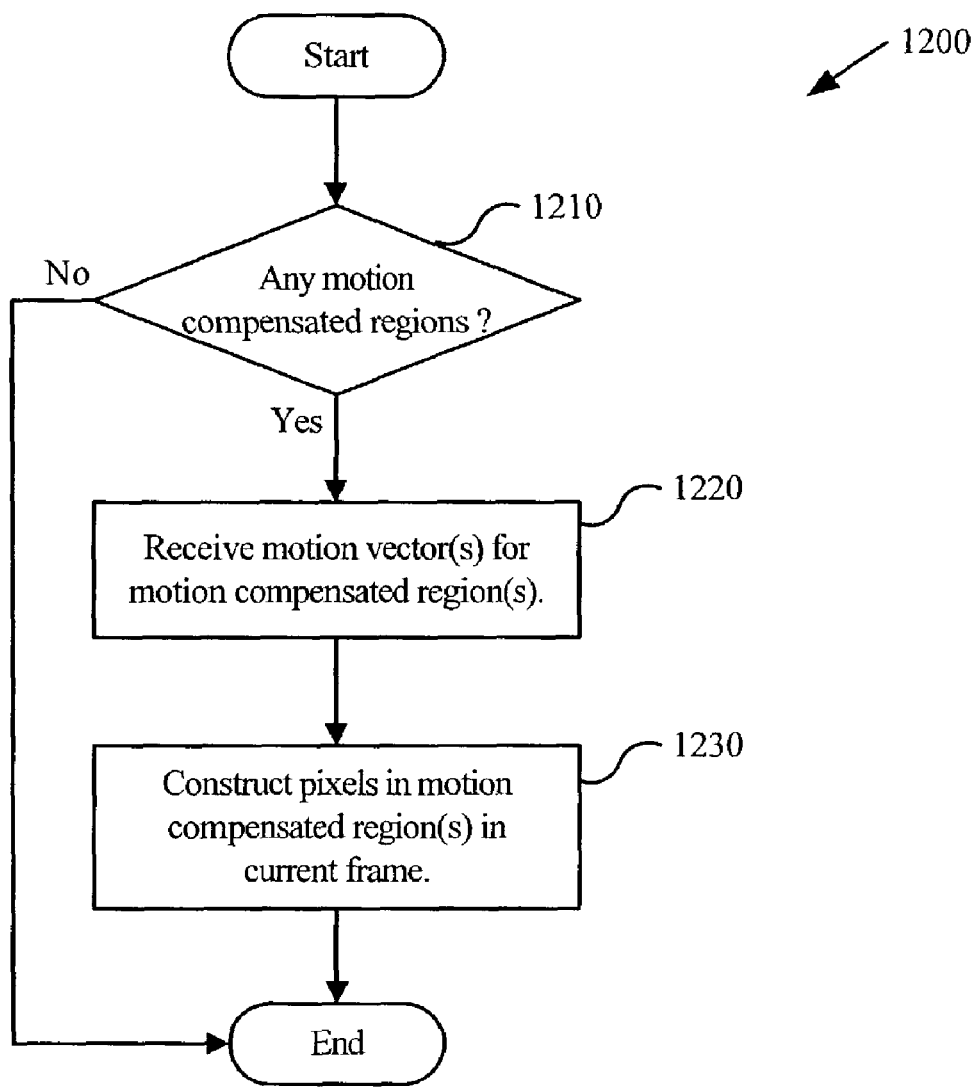
FIG. 12 is a flowchart showing a technique for motion compensation for screen capture video.

FIG. 12 shows a technique (1200) for performing motion compensation for screen capture video. A decoder such as the screen capture decoder described with reference to FIG. 4 performs the motion compensation technique (1200).

For the sake of simplicity, FIG. 12 does not show how the technique (1200) relates to the rest of the encoding/decoding process. Moreover, depending on implementation, the timing and order of operations in the technique (1200) can vary. For example, in some implementations, the placement of conditional logic is rearranged or the ordering of various operations is switched.

FIG. 12 shows a generalized technique (1200) for performing motion compensation from a reference frame for one or more regions of a current frame. The decoder determines (1210) whether any regions of pixels in the current frame are motion compensated. For example, the decoder checks a pixel map for the current frame or checks a flag in the frame header for the current frame. Alternatively, the decoder determines whether regions are motion compensated with some other mechanism.

If no regions of pixels in the current frame are motion compensated, the decoder continues with other processing for the current frame. For example, the decoder assembles the current frame using intra pixel data and/or values for pixels that did not change relative to the reference frame, as described above.

On the other hand, if the current frame includes any motion compensated regions of pixels, the decoder receives (1220) the motion vector(s) for the motion compensated region(s). For example, for each motion compensated region, the decoder receives a two-dimensional motion vector that specifies a displacement ($\Delta x$, $\Delta y$) from the location (x, y) of the region in the current frame. In one implementation, the motion vectors can specify displaced locations (x+$\Delta x$, y+$\Delta y$) anywhere in the reference frame, but fixed or varying motion vector size limits are also possible.

The decoder constructs (1230) pixels in the motion compensated region(s) in the current frame. For example, for a motion vector ($\Delta x$, $\Delta y$) and a motion compensated region at the location (x, y) in the current frame, the decoder uses the pixel values of a corresponding region at the displaced location (x+$\Delta x$, y+$\Delta y$) in the reference frame.

The decoder then continues with other processing for the current frame. For example, the decoder assembles the current frame using the motion compensated region(s) together with intra pixel data and/or values for pixels that did not change relative to the reference frame, as described above. Subsequently, the encoder can continue with motion compensation for the next frame.

Having described and illustrated the principles of my invention with reference to various described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of my invention may be applied, I claim as my invention all such embodiments as may come within the scope and spirit of the following claims and equivalents thereto.

I claim:

1. A screen capture encoder comprising:
a screen capture module for recording plural images of a computer desktop environment in operation as plural screen capture frames, the plural screen capture frames including a current screen capture frame;
a frame buffer for storing a reference screen capture frame; and
a motion estimation module adapted to screen capture video, the motion estimation module for estimating motion from the reference screen capture frame for one or more regions of pixel values in the current screen capture frame, wherein the estimating comprises for a current region of pixel values among the one or more regions of pixel values in the current screen capture frame:
searching for a candidate motion vector for the current region of pixel values in the current screen capture frame according to a motion vector search pattern, wherein the current region of pixel values is at a location (x, y) in the current screen capture frame, and wherein the motion vector search pattern prioritizes motion vectors characteristic of motion in screen capture video such that the motion vectors characteristic of motion in screen capture video are evaluated before other motion vectors;
evaluating the candidate motion vector for the current region of pixel values, wherein the candidate motion vector indicates a displacement location (Δx+x, Δy+y) of a reference frame region of pixel values in the reference screen capture frame, wherein the evaluating the candidate motion vector comprises:
comparing the current region at the location (x, y) in the current screen capture frame with the reference frame region at the displacement location (Δx+x, Δy+y) in the reference screen capture frame; and
computing a distortion measure based at least in part upon the comparing, wherein the distortion measure measures a difference between the current region and the reference frame region using identical pixel value matching criteria; and
selecting a final motion vector for the current region of pixel values based at least in part on the evaluating.

2. The screen capture encoder of claim 1 further comprising:
a segmenter for separating palettized content and continuous tone content in intra pixel values in the current screen capture frame following motion estimation, the intra pixel values having different values at corresponding locations in the reference screen capture frame and the current screen capture frame.

3. The screen capture encoder of claim 2 further comprising:
a first encoding module for encoding the continuous tone content; and
a second encoding module for encoding the palettized content.

4. The screen capture encoder of claim 1 wherein the motion vectors characteristic of motion in screen capture video include pure horizontal motions vectors and pure vertical motion vectors.

5. The screen capture encoder of claim 1 wherein the distortion measure is Hamming distance.

6. The screen capture encoder of claim 1 wherein the motion estimation module sub-samples the distortion measure.

7. The screen capture encoder of claim 1 wherein the motion vector search pattern is for a search area comprising the entire reference screen capture frame.

8. The screen capture encoder of claim 1 wherein the motion estimation module sets boundaries for the one or more regions of pixel values based on detected value changes.

9. The screen capture encoder of claim 1 wherein one or more two-dimensional motion motion vectors including the final motion vectors parameterize the motion.

10. A screen capture decoder comprising:
a buffer for storing a reference screen capture frame; and
a motion compensation module adapted to screen capture video, the motion compensation module for compensating for motion from the reference screen capture frame for one or more regions of pixel values in a current screen capture frame, wherein the compensating comprises for a current region of pixel values a location (x, y) among the one or more regions of pixel values in the current screen capture frame:
receiving and processing a final motion vector that specifies a displacement for the current region of pixel values, the final motion vector calculated at a screen capture encoder based on an evaluation of one or more candidate motion vectors for the current region of pixels, wherein the evaluation comprises, for a given one of the one or more candidate motion vectors:
comparing the current region at the location (x, y) in the current screen capture frame with a reference frame region at a displacement location (Δx+x, Δy+y) in the reference screen capture frame; and
computing a distortion measure based at least in part upon the comparing, wherein the distortion measure measures a difference between the current region and the reference frame region using identical pixel value matching criteria;
wherein the one or more candidate motion vectors are evaluated according to a motion vector search pattern, and wherein the motion vector search pattern prioritizes motion vectors characteristic of motion in screen capture video such that the motion vectors characteristic of motion in screen capture video are evaluated before other motion vectors;
wherein each of the reference and the current screen capture frames is an image recorded from at least part of a computer desktop environment in operation.

11. The screen capture decoder of claim 10 wherein the decoder uses the motion compensation module for less than all pixel values of the current screen capture frame.

12. The screen capture decoder of claim 10 further comprising:
a frame assembler for assembling the current screen capture frame based at least in part upon the one or more regions, palettized content in intra pixels following motion estimation, and continuous tone content in the intra pixels following motion estimation.

13. The screen capture decoder of claim 12 further comprising:
a first decoding module for decoding the continuous tone content; and
a second decoding module for decoding the palettized content.

14. The screen capture decoder of claim 10 wherein the motion vector search pattern is for a search area comprising the entire reference screen capture frame.

15. The screen capture decoder of claim 10 wherein one or more two-dimensional motion vectors including the final motion vector parameterize the motion.

16. A computer-readable medium storing computer-executable instructions for causing a computer system programmed thereby to perform a method comprising:
searching for a candidate motion vector for a current frame region of pixel values in a current screen capture frame according to a motion vector search pattern, wherein the current screen capture frame is recorded from a computer desktop environment in operation, wherein the current frame region is at a location (x, y) in the current screen capture frame, and wherein the motion vector search pattern prioritizes motion vectors characteristic of motion in screen capture video such that the motion vectors characteristic of motion in screen capture video are evaluated before other motion vectors;
evaluating the candidate motion vector for the current frame region, wherein the candidate motion vector indicates a displacement location (Δx+x, Δy+y) of a reference frame region of pixel values in a reference screen capture frame wherein the evaluating the candidate motion vector comprises:
comparing the current frame region at the location (x, y) in the current screen capture frame with the reference frame region at the displacement location (Δx+, Δy+y) in the reference screen capture frame; and
computing a distortion measure based at least in part upon the comparing, wherein the distortion measure measures a difference between the current frame region and the reference frame region using identical pixel value matching criteria;
selecting a final motion vector for the current frame region; and
encoding the current frame region with the final motion vector.

17. The computer-readable medium of claim 16 wherein the identical pixel value matching criteria are used for less than all pixel values in the current frame region.

18. The computer-readable medium of claim 16 wherein the identical pixel value matching criteria comprises Hamming distance.

19. The computer-readable medium of claim 16 wherein the motion vectors characteristic of motion in screen capture video include pure horizontal motion vectors and pure vertical motion vectors.

20. The computer-readable medium of claim 16 wherein a frame buffer stores the reference screen capture frame.

21. The computer-readable medium of claim 16 wherein the current frame region is defined by a boundary box, and wherein dimensions and location of the boundary box are based on locations of changed pixels in the current screen capture frame.

22. In a computer system, a method of motion estimation comprising:
in a motion estimation module adapted to screen capture video, for each of one or more motion vectors for a current frame region in screen capture video, computing a count of differing pixel values, each of the one or more motion vectors specifying a different reference frame region in the screen capture video, wherein the screen capture video comprises plural images recorded from a computer desktop environment in operation as plural screen capture frames, the plural screen capture frames including the current frame region, and wherein the computing the count of differing pixel values for each of the one or more motion vectors includes,
comparing multiple-bit pixel values at each of one or more corresponding locations in the current frame region and the different reference frame region specified by the motion vector; and
for each of the one or more corresponding locations, incrementing the count of differing pixel values based upon whether the compared multiple-bit pixel values are equal or not equal;
selecting a final motion vector for the current frame region, wherein the selecting is based at least in part upon the computing the differing pixel value count; and
encoding the current frame region with the final motion vector.

23. A computer-readable medium having stored thereon computer-executable instructions for causing a computer system programmed thereby to perform the method of claim 22.

24. The method of claim 22 wherein the one or more corresponding locations are less than all locations in the current frame region and the different reference frame region specified by the motion vector.

25. The method of claim 22 wherein the multiple-bit pixel values are for palettized screen content.

26. The method of claim 22 wherein the multiple-bit pixel values are for continuous tone screen content.

27. A computer-readable medium storing computer-executable instructions for causing a computer system programmed thereby to perform a method of motion estimation from a reference frame to a current frame, the method comprising:
in a motion estimation module adapted to screen capture video, for each of one or more candidate motion vectors for a current frame region,
selecting the candidate motion vector according to a prioritized motion vector search pattern adapted to screen capture video that prioritizes plural pure horizontal motion vectors and plural pure vertical motion vectors above all other motion vectors; and
computing a distortion measure for the selected candidate motion vector;
selecting a final motion vector for the current frame region; and
encoding the current frame region with the final motion vector.

28. The computer-readable medium of claim 27 wherein screen capture video includes the reference frame and the current frame.

29. A computer-readable medium storing computer-executable instructions for causing a computer system programmed thereby to perform a method comprising:
  in a motion estimation module adapted to screen capture video, evaluating a candidate motion vector for a current frame region of pixel values in a current screen capture frame, wherein the current screen capture frame is an image recorded from a computer desktop environment in operation, wherein the current frame region is at a location (x, y) in the current screen capture frame, wherein the candidate motion vector indicates a displacement location ($\Delta x+x$, $\Delta y+y$) for a reference frame region of pixel values in a reference screen capture frame, and wherein the evaluating includes computing a sub-sampled pixel value distortion measure for the candidate motion vector;
  selecting a final motion vector for the current frame region; and
  encoding the current frame region with the final motion vector.

30. The computer-readable medium of claim 29 wherein the method further comprises:
  for each of one or more additional candidate motion vectors, repeating the evaluating, each of the evaluated motion vectors having a sub-sampled distortion measure that satisfies a threshold, and wherein the selecting the final motion vector is based at least in part upon computation of a non-sub-sampled distortion measure for at least one of the evaluated motion vectors.

31. A computer-readable medium storing computer-executable instructions for causing a computer system programmed thereby to perform a method comprising:
  using segmentation data to identify one or more unchanged pixels between a current screen capture frame and a reference screen capture frame, wherein the current screen capture frame is an image recorded from a computer desktop environment in operation;
  performing motion compensation for one or more regions of the current screen capture frame, wherein the motion compensation comprises, for each of the one or more motion compensated regions;
  receiving one or more motion vectors; and
  calculating motion compensated pixel values; and
  assembling the current screen capture frame based at least in part upon the one or more identified unchanged pixels and the one or more motion compensated regions.

32. The computer-readable medium of claim 31 wherein the method further comprises decoding intra pixel data of the current screen capture frame, wherein the assembling is further based at least in part upon the decoded intra pixel data.

33. A method comprising:
  comparing pixel values at corresponding locations in a current screen capture frame and a reference screen capture frame to identify pixels in the current screen capture frame with changed values;
  creating a bounding box around a group of the pixels in the current screen capture frame with changed values;
  performing motion estimation for the bounding box, thereby determining motion data for the bounding box relative to the reference screen capture frame;
  comparing the bounding box with a predicted bounding box to identify intra pixels within the bounding box not predicted by the motion estimation; and
  encoding the intra pixels using intra compression.

34. A computer-readable medium storing computer-executable instructions for causing a computer system programmed thereby to perform the method of claim 33.

* * * * *